(12) United States Patent
Watanabe et al.

(10) Patent No.: US 8,101,311 B2
(45) Date of Patent: Jan. 24, 2012

(54) FUEL CELL AND ELECTRONIC APPARATUS WITH THE SAME MOUNTED THEREON

(75) Inventors: Yasuhiro Watanabe, Tokyo (JP); Kazuhiko Otsuka, Saitama (JP); Masahiko Tahara, Kanagawa (JP); Kazutoshi Nomoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 10/536,599

(22) PCT Filed: Nov. 25, 2003

(86) PCT No.: PCT/JP03/14977
§ 371 (c)(1), (2), (4) Date: Jul. 19, 2005

(87) PCT Pub. No.: WO2004/054026
PCT Pub. Date: Jun. 24, 2004

(65) Prior Publication Data
US 2005/0255340 A1    Nov. 17, 2005

(30) Foreign Application Priority Data
Dec. 12, 2002 (JP) ................ P2002-361449

(51) Int. Cl.
H01M 8/06 (2006.01)
H01M 8/04 (2006.01)

(52) U.S. Cl. ........ 429/439; 429/413; 429/414; 429/433; 429/434; 429/436; 429/442; 429/443; 429/444

(58) Field of Classification Search ............. 429/26, 429/34, 38, 39, 413, 414, 433, 434, 436, 429/439, 442–444
See application file for complete search history.

(56) References Cited

U.S. PATENT DOCUMENTS

| 4,950,566 | A | 8/1990 | Huggins et al. |
| 6,054,228 | A | 4/2000 | Cisar et al. |
| 6,277,508 | B1 * | 8/2001 | Reiser et al. ............ 429/17 |
| 6,613,467 | B1 * | 9/2003 | Chizawa et al. ............ 429/26 |
| 2001/0019793 | A1 * | 9/2001 | Tsuyoshi ............ 429/39 |
| 2002/0028364 | A1 * | 3/2002 | Kaufmann ............ 429/19 |
| 2002/0051898 | A1 * | 5/2002 | Moulthrop et al. ............ 429/17 |

(Continued)

FOREIGN PATENT DOCUMENTS
CN    1378709    11/2002
(Continued)

Primary Examiner — Gregg Cantelmo
Assistant Examiner — Eugenia Wang
(74) Attorney, Agent, or Firm — K&L Gates LLP

(57) ABSTRACT

A fuel cell and an electronic apparatus with same mounted thereon are provided. The fuel cell includes a power generation unit provided with a conduit for an oxidant gas containing at least oxygen, a heat radiation unit connected to the power generation unit so as to radiate heat from the power generation unit, a gas flow means for causing the oxidant gas to flow in the conduit, and a cooling means driven independently from the gas flow means so as to cool the heat radiation unit. By independently controlling the driving of the gas flow means and the cooling means, the fuel cell can be driven in such a manner that the temperature of the power generation unit and the amount of water remaining in the power generation unit are regulated into preferable conditions. Furthermore, it is possible to provide a fuel cell and an electronic apparatus with the same mounted thereon in which power generation can be performed stably and various apparatuses are contained therein in a compact form.

29 Claims, 13 Drawing Sheets

U.S. PATENT DOCUMENTS

| | | | |
|---|---|---|---|
| 2002/0155333 A1* | 10/2002 | Fitts et al. | 429/26 |
| 2002/0168556 A1* | 11/2002 | Leboe et al. | 429/13 |
| 2002/0180448 A1* | 12/2002 | Imamura et al. | 324/439 |
| 2003/0022042 A1* | 1/2003 | Wells et al. | 429/23 |

FOREIGN PATENT DOCUMENTS

| | | |
|---|---|---|
| EP | 1132986 | 9/2001 |
| JP | 01-186768 | 7/1989 |
| JP | 03-167712 | 7/1991 |
| JP | 06-267564 | 9/1994 |
| JP | 09-022719 | 1/1997 |
| JP | 09-312165 | 12/1997 |
| JP | 10-064567 | 3/1998 |
| JP | 10-162842 | 6/1998 |
| JP | 2000-251908 | 9/2000 |
| JP | 2000-256007 | 9/2000 |
| JP | 2000-353536 | 12/2000 |
| JP | 2001-015136 | 1/2001 |
| JP | 2001-015145 | 1/2001 |
| JP | 2001-256988 | 9/2001 |
| JP | 2002-134154 | 5/2002 |
| JP | 2002-352817 | 6/2002 |
| JP | 2002-231292 | 8/2002 |
| JP | 2002-260704 | 9/2002 |
| JP | 2002-134154 | 10/2002 |
| JP | 2002-313381 | 10/2002 |
| WO | 99/34467 | 7/1999 |
| WO | WO 00/14819 * | 3/2000 |
| WO | WO 01/54218 A2 * | 1/2001 |
| WO | WO0113441 | 2/2001 |

* cited by examiner

F I G . 1
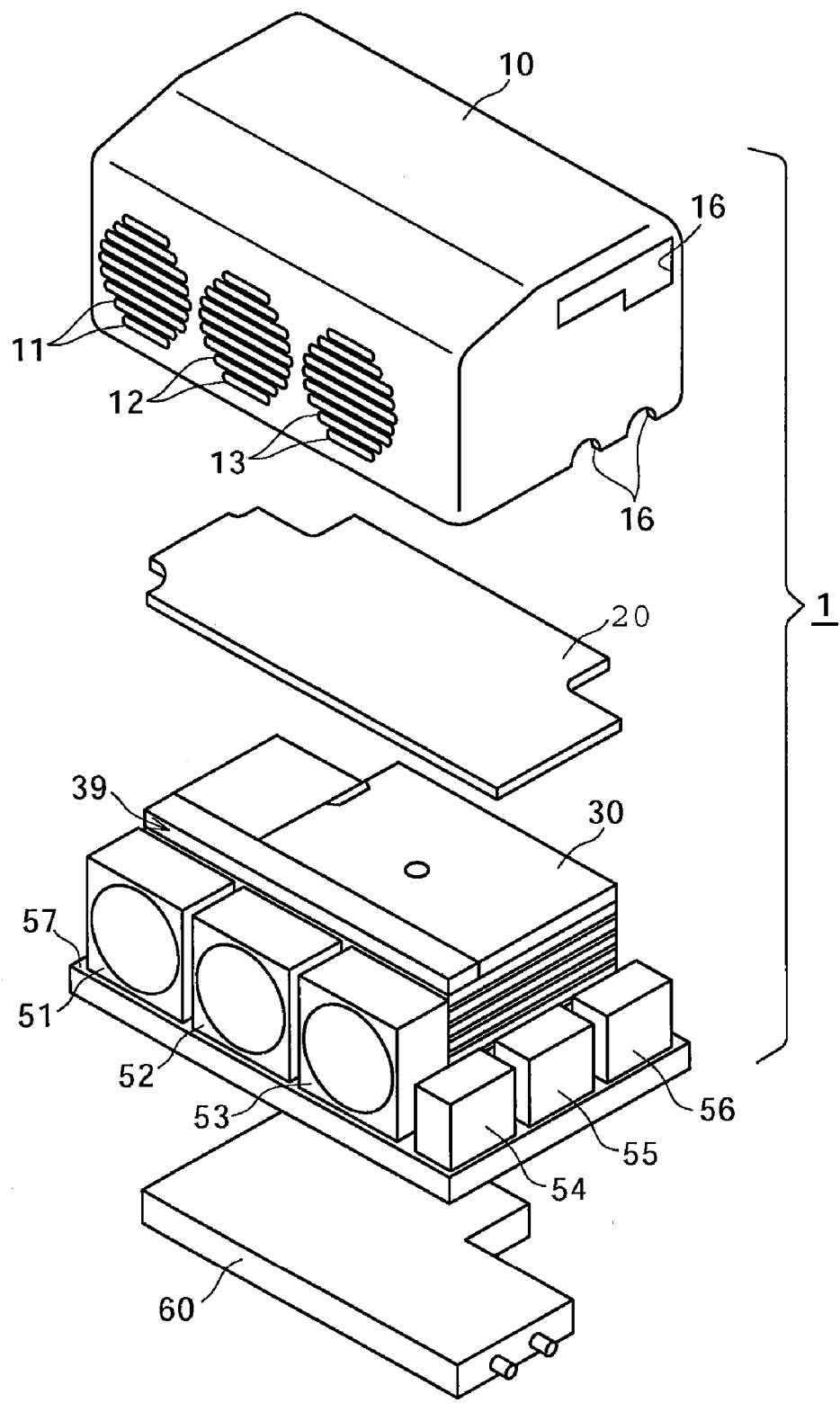

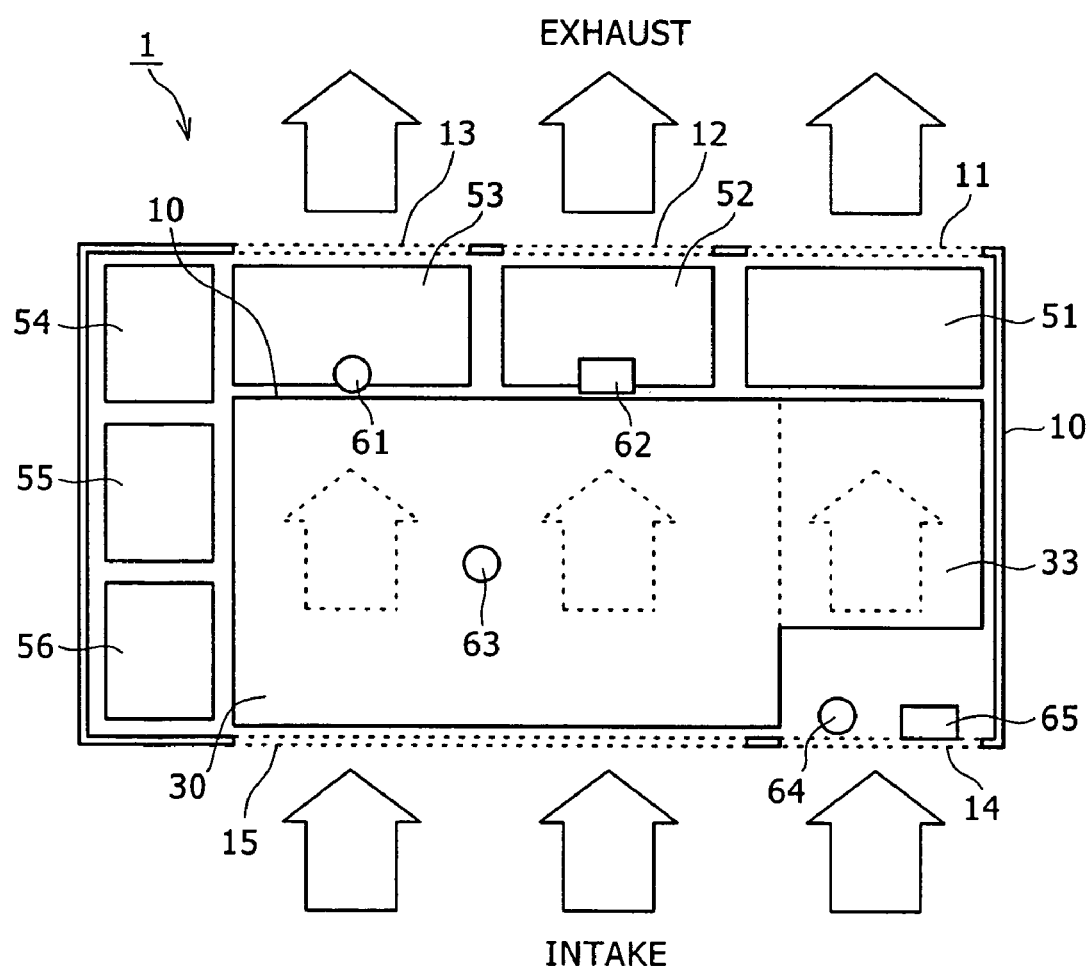

FUEL CELL AND ELECTRONIC APPARATUS WITH THE SAME MOUNTED THEREON

CROSS REFERENCE TO RELATED APPLICATION

The present application claims priority to Japanese Patent Document No. P2002-361449 filed on Dec. 12, 2002, the disclosure of which is herein incorporated by reference.

BACKGROUND

The present invention relates to a fuel cell and an electronic apparatus with the same mounted thereon. More particularly, the present invention relates to a fuel cell and an electronic apparatus with the same mounted thereon in which various apparatuses for stably performing power generation by a fuel cell or cells are contained in a compact form.

A fuel cell is a power generation device for generating electric power by an electrochemical reaction between a fuel, such as hydrogen gas, and an oxidant such as oxygen contained in air. In these years, the fuel cells have been paid attention to as a power generation device free of environmental pollution, since the product upon power generation therein is water, and the use of a fuel cell as a drive power source for driving a vehicle, for example, has been tried.

Furthermore, the application of a fuel cell is not limited to the above-mentioned drive power source for driving automobiles, and the development of fuel cells as drive power sources for portable electronic apparatuses such as notebook type personal computers, cellular phones and PDAs has been made vigorously. It is important for these fuel cells to be capable of stably outputting required electric power and to have such size and weight as to be portable, and a variety of technical developments have been carried out vigorously.

In addition, the quantity of electric power outputted from a fuel cell can be enhanced by joining a plurality of power generation cells (unit cells). For example, there has been developed a fuel cell in which a joint body having electrodes provided on both sides of a solid state polymer electrolyte membrane is clamped between separators to form a power generation cell, and such power generation cells are laminated to form a stack structure.

Meanwhile, at the time of generating electric power by the fuel cell configured as above, it is necessary for the solid state polymer electrolyte membrane to conduct protons therethrough and it is important for the solid state polymer electrolyte membrane to be moistened appropriately.

However, the power generation reaction in the fuel cell is an exothermic reaction, and the portion where the power generation reaction occurs vigorously tends to be brought to a high temperature. Therefore, there are cases in which the amount of water contained in the solid state polymer electrolyte membrane is decreased attendant on the driving of the fuel cell, with the result of a trouble in stable power generation in the fuel cell.

On the other hand, water is produced by the electrochemical reaction at the time of power generation. Where water is accumulated in the conduit for a fuel gas formed in the separator, the conduit may be clogged with water to hamper smooth flow of the fuel gas in the conduit. Where smooth flow of the fuel gas is not achieved in the conduit, it is difficult to sufficiently supply the fuel gas into the plane of the joint body, so that the power generation by the fuel cell cannot be performed satisfactorily.

The above-mentioned two problems show that it is difficult to simultaneously achieve both the restraint of the temperature rise in the fuel cell at the time of power generation by the fuel cell and the control of the amount of water contained in the fuel cell. Therefore, there is a demand for a technology by which these problems can be solved at the same time. Particularly, in the fuel cell having the stack structure, there is a demand for a technology by which a smooth flow of the fuel gas in the conduits formed in a plurality of separators is achieved, and oxygen-containing air is taken in from the exterior of the fuel cell so as to bring the joint body constituting the fuel cell into the state of being moistened appropriately, making it possible to stably outputting the required electric power.

Besides, where a fuel cell is used for driving a portable electronic apparatus, it is desirable that the fuel cell is also portable, and there is a demand for a fuel cell which is capable of stable power generation and which has been reduced in size.

SUMMARY

The present invention has been made in consideration of the above-mentioned problems. Accordingly, the present invention provides a fuel cell and an electronic apparatus with the same mounted thereon by which electric power can be generated stably and in which various apparatuses for driving the fuel cell are contained in a compact form.

According to an embodiment of the present invention, there is provided a fuel cell including: a power generation unit provided with a conduit for an oxidant gas containing at least oxygen; a heat radiation unit connected to the power generation unit so as to radiate heat from the power generation unit; a gas flow means for causing the oxidant gas to flow in the conduit; and a cooling means driven independently from the gas flow means so as to cool the heat radiation unit. By such a fuel cell as this, it is possible to independently drive the gas flow means and the cooling means, thereby performing accurately the restraint of temperature rise in the power generation unit and the control of the amount of water contained in the power generation unit, and permitting the power generation unit to stably generate electric power.

The above-mentioned fuel cell is characterized in that the power generation unit has a joint body including a conductor having ionic conductivity and electrodes opposed to each other with the conductor therebetween, and separators clamping the joint body therebetween. With moisture sufficiently absorbed in the conductor, it is possible to form a fuel cell which can perform the power generation reaction at the time of power generation without any trouble and which has a small size and a high output.

Further, the above-mentioned fuel cell is characterized in that the conductor is a proton conductor.

Furthermore, the above-mentioned fuel cell is characterized in that the separators each have a heat transfer portion extending from the inside of the separator to the heat radiation unit. With such a heat transfer portion, the heat generated upon the power generation reaction can be speedily transmitted from the power generation unit to the heat radiation unit, and the temperature rise in the power generation unit can be restrained.

In addition, the above-mentioned fuel cell is characterized in that the separators each has a water suction means for sucking and removing water from the conduit. With such a water suction means, water accumulated in the conduit for flow of the oxidant gas can be sucked out, and the oxidant gas can be made to flow smoothly in the conduit.

Furthermore, the above-mentioned fuel cell is characterized in that the power generation unit has a stack structure in which the joint body and the separators are laminated. With the stack structure thus formed, it is possible to enhance the output power of the power generation unit and to output the required electric power.

Further, the above-mentioned fuel cell is characterized in that the separators each have an in-plane conduit for supplying the fuel into the plane where the separator and the joint body make contact. The fuel is supplied to roughly the entire surface of the joint body by the in-plane conduit, and power generation can be performed efficiently.

Furthermore, the above-mentioned fuel cell is characterized in that the separators are each provided with a supply hole for supplying the fuel into the in-plane conduit, and a discharge hole for discharging the fuel from the in-plane conduit. With such a supply hole, it is possible to supply the fuel to each separator and to discharge the fuel after the power generation reaction from the in-plane conduit.

Further, the above-mentioned fuel cell is characterized in that, between the adjacent separators, the supply holes are connected to each other to form a supply passage for supplying the fuel to the separators, and the discharge holes are connected to each other to form a discharge passage for discharging the fuel from the separators. In the stack structure in which the joint body and the separators are laminated, it is possible to supply the fuel gas at a stroke to the power generation unit through the supply passage, and to discharge the fuel gas after the power generation reaction through the discharge passage.

Furthermore, the above-mentioned fuel cell is characterized in that the sectional area of a connection portion where the in-plane conduit is connected to the supply passage is smaller than the sectional area of the in-plane conduit. With such a connection portion, it is possible to discharge water accumulated in the in-plane conduit at the time of discharging the fuel from the in-plane conduit.

In addition, the above-mentioned fuel cell is characterized in that the sectional area of a connection portion where the in-plane conduit is connected to the discharge passage is smaller than the sectional area of the in-plane conduit. With such a connection portion, it is possible to discharge water accumulated in the in-plane conduit at the time of discharging the fuel from the in-plane conduit.

Besides, the above-mentioned fuel cell is characterized in that the sectional area of a connection portion where the in-plane conduit is connected to the supply passage is smaller than the sectional area of a connection portion where the in-plane conduit is connected to the discharge passage. With such a connection portion, it is possible to discharge water accumulated in the in-plane conduit at the time of discharging the fuel from the in-plane conduit.

Further, the above-mentioned fuel cell is characterized by having a water discharge means for discharging water from the in-plane conduit by generating a difference in pressure on the water between the supply passage side and the discharge passage side, in the in-plane conduit in which the water is accumulated. With such a water discharge means, the water accumulated in the in-plane conduit is discharged from the in-plane conduit by the pressure difference, so that the fuel can smoothly flow in the in-plane conduit.

The above-mentioned fuel cell is characterized in that the water discharge means opens a part of the discharge passage to the atmosphere so as to generate a pressure difference and thereby to discharge the water from the in-plane conduit. With such a water discharge means, a pressure difference is instantaneously generated in the in-plane conduit by opening the discharge passage to the atmosphere, and the water can be discharged from the in-plane conduit by the pressure difference.

In addition, the fuel cell according to the present invention is characterized in that the cooling means causes the gas stagnating in the vicinity of at least the heat radiation unit to flow, thereby releasing heat from the heat radiation unit. The gas made to flow releases the heat sequentially from the heat radiation unit, whereby the temperature rise in the heat generation unit can be restrained.

Besides, the fuel cell according to the present invention is characterized by having a detection means for detecting an environmental condition for controlling the driving of the gas flow means and the cooling means. With the gas flow means and the cooling means driven according to the environmental condition(s), the power generation unit can be driven under the condition where stable power generation is performed.

Further, the above-mentioned fuel cell is characterized in that the detection means detects at least temperature and/or humidity as the environmental condition(s). With the temperature and/or humidity detected, it is possible to calculate the temperature of the power generation unit and the amount of water remaining in the power generation unit, and to perform power generation under preferable conditions.

In addition, the above-mentioned fuel cell is characterized in that the detection means are arranged at such positions as to be capable of detecting the temperature and humidity of the oxidant gas supplied to the power generation unit, the temperature and humidity of the oxidant gas discharged from the power generation unit, and the temperature of the power generation unit. With the temperature and/or humidity detected at these portions in the fuel cell, it is possible to accurately calculate the amount of water remaining in the power generation unit.

Furthermore, the above-mentioned fuel cell is characterized by having a control substrate supporting thereon a control circuit for controlling the driving of at least the gas flow means and the cooling means on the basis of the environmental condition(s). With such a control circuit, it is possible to control the driving of the gas flow means and the cooling means and thereby to permit the power generation unit to generate electric power under preferable conditions.

In addition, the above-mentioned fuel cell is characterized in that the driving of the gas flow means and the cooling means is controlled according to the amount of water contained in the power generation unit which is calculated based on the environmental condition(s) and the quantity of electric power generated by the power generation unit. With such gas flow means and cooling means of which the driving is controlled in this manner, it is possible to bring the amount of water remaining in the power generation unit into a preferable condition, and to perform stable power generation.

Besides, the fuel cell according to the present invention is characterized by having a fuel supply means for supplying a fuel for reaction with the oxidant gas from a fuel storage unit to the power generation unit at the time of driving the power generation unit. With such a fuel supply means, the fuel can be supplied from the fuel gas storage unit provided separately from the power generation unit to the power generation unit.

In addition, the fuel cell according to the present invention is characterized by having a pressure control means for controlling the pressure of the fuel gas supplied to the power generation unit. By supplying the fuel while controlling the pressure of the fuel, it is possible for the power generation unit to perform stable power generation.

According to the present invention, there is provided a fuel cell including: a power generation unit provided in its side surface with an opening portion of a conduit for an oxidant gas containing at least oxygen; and a heat radiation unit connected to the power generation unit so as to radiate heat from the power generation unit. A gas flow means for causing the oxidant gas to flow in the conduit is disposed along a side surface of the power generation unit, and a cooling means for cooling the heat radiation unit is disposed along the side surface adjacently to the gas flow means. With such a fuel cell, the apparatuses contained in the fuel cell can be disposed in a compact form, the oxidant gas can be made to flow efficiently, and required power generation can be stably performed in a small-sized fuel cell.

The above-mentioned fuel cell is characterized in that the fuel cell has a casing for covering at least the power generation unit, the heat radiation unit, the gas flow means, and the cooling means. With such a casing, it is possible to protect the various apparatuses arranged in the fuel cell from the exterior, and to control the flow of air in the fuel cell.

In addition, the above-mentioned fuel cell is characterized in that the gas flow means sucks in the oxidant gas through an opening portion, and discharges the oxidant gas through a first exhaust port provided in the casing, thereby causing the oxidant gas to flow in the conduit. With such a gas flow means, it is possible to cause the oxidant gas to flow efficiently in the fuel cell, and to perform stable power generation.

Further, the above-mentioned fuel cell is characterized in that the gas flow means sucks the oxidant gas into the fuel cell through a first intake port provided in the casing so as thereby to form a flow of the oxidant gas independent from the flow of the oxidant gas generated by the cooling means. With the oxidant gas sucked in through the first intake port, the oxidant gas can be made to flow, separately from the flow of the oxidant gas generated by the cooling means.

Furthermore, the above-mentioned fuel cell is characterized in that the first intake port is provided at a position opposed to the first exhaust port, and the gas flow means is disposed between the first intake port and the first exhaust port. With the first intake port, the first exhaust port and the gas flow means arranged as such positions, the flow of the oxidant gas supplied to the power generation unit and the flow of the oxidant gas for cooling can be made to be separate flows.

In addition, the fuel cell according to the present invention is characterized in that the cooling means exhausts the oxidant gas through a second exhaust port provided in the casing to thereby cause the oxidant gas to flow in the vicinity of the heat radiation unit. With such a cooling means, it is possible for the flowing oxidant gas to release heat sequentially from the heat radiation unit and thereby to restrain the temperature rise in the power generation unit.

The above-mentioned fuel cell is characterized in that the cooling means sucks the oxidant gas into the fuel cell through a second intake port provided in the casing. With such a cooling means, it is possible to form a flow different from the flow of the oxidant gas caused by the gas flow means.

Further, the above-mentioned fuel cell is characterized in that the second intake port is provided at a position opposed to the second exhaust port, and the cooling means is disposed between the second intake port and the second exhaust port. With the second intake port, the second exhaust port and the cooling means arranged in this manner, it is possible to cause the oxidant gas to flow smoothly for releasing heat from the heat radiation unit.

The fuel cell according to the present invention is characterized in that the opening portion is tapered so as to be narrowed along the depth direction of the conduit for the oxidant gas. With such an opening portion, it is possible to reduce the conduit resistance at the time of causing the oxidant gas to flow in the conduit for the oxidant gas, and to permit the oxidant gas to flow smoothly.

The above-mentioned fuel cell is characterized in that the opening width of the opening portion is greater than the conduit width of the conduit for the oxidant gas. With such an opening width, it is possible to reduce the conduit resistance at the time of causing the oxidant gas to flow in the conduit.

Further, the above-mentioned fuel cell is characterized in that the opening width is broader than the conduit width in the sideways direction and/or the longitudinal direction. With the opening portion having such an opening width, it is possible to further reduce the conduit resistance.

In addition, the fuel cell according to the present invention is characterized by having detection means for detecting an environmental condition for controlling the driving of the gas flow means and the cooling means. With the gas flow means and the cooling means driven according to the environmental condition(s), power generation can be performed stably.

Further, the above-mentioned fuel cell is characterized in that the detection means detect(s) at least temperature and/or humidity as the environmental condition(s). With temperature and/or humidity detected, it is possible to calculate the temperature of the power generation unit and the amount of water contained in the power generation unit, and to perform power generation under favorable conditions.

Furthermore, the above-mentioned fuel cell is characterized in that the detection means are arranged respectively at such positions as to be capable of detecting the temperature and humidity of the oxidant gas supplied to the power generation unit, the temperature and humidity of the oxidant gas discharged from the power generation unit, and the temperature of the power generation unit. With temperature and/or humidity detected at these positions, it is possible to accurately calculate the amount of water remaining in the power generation unit.

In addition, the above-mentioned fuel cell is characterized by having a control substrate supporting thereon a control circuit for controlling the driving of at least the gas flow means and the cooling means on the basis of the environmental conditions. With such a control substrate, it is possible to control the gas flow means and the cooling means.

The fuel cell according to the present invention is characterized in that a water discharge means for discharging water from the conduit for the fuel gas supplied to the power generation unit for reaction with the oxidant gas is disposed along an end face of the power generation unit. With the water discharge means disposed in this manner, it is possible to discharge an excess of water accumulated in the fuel cell, and to efficiently use the space in the fuel cell.

In addition, the fuel cell according to the present invention is characterized in that a fuel gas supply means for supplying the fuel gas from a fuel gas storage unit to the power generation unit at the time of driving the power generation unit is disposed along an end face of the power generation unit. With such a fuel gas supply means, it is possible to supply the fuel gas from the fuel gas storage unit provided separately from the power generation unit to the power generation unit, and to efficiently use the space in the fuel cell.

According to the present invention, there is provided an electronic apparatus including a fuel cell. The fuel cell includes: a power generation unit provided with a conduit for an oxidant gas containing at least oxygen; a heat radiation unit connected to the power generation unit so as to radiate heat from the power generation unit; a gas flow means for causing the oxidant gas to flow in the conduit; and a cooling means driven independently of the gas flow means so as to cool the heat radiation unit. The electronic apparatus is driven by being supplied with electric power from the fuel cell. With such an electronic apparatus, the electronic apparatus can be driven stably.

In addition, according to the present invention, there is provided an electronic apparatus including a fuel cell. The fuel cell includes: a power generation unit provided in its side surface with an opening portion of a conduit for an oxidant gas containing at least oxygen; and a heat radiation unit connected to the power generation unit so as to radiate heat from the power generation unit. A gas flow means for causing the oxidant gas to flow in the conduit is disposed along a side surface of the power generation unit, and a cooling means for cooling the heat radiation unit is disposed along the side surface adjacently to the gas flow means, and the electronic apparatus is driven by being supplied with electric power from the fuel cell. With such an electronic apparatus, the electronic apparatus can be driven stably, and it is possible to provide a portable electronic apparatus.

Additional features and advantages of the present invention are described in, and will be apparent from, the following Detailed Description and the figures.

BRIEF DESCRIPTION OF THE FIGURES

FIG. 1 is an exploded perspective view showing the structure of a fuel cell according to an embodiment of the present invention

FIG. 8 is a plan view showing the structure of the fuel cell according to an embodiment of the present invention.

DETAILED DESCRIPTION

Figure 2C:
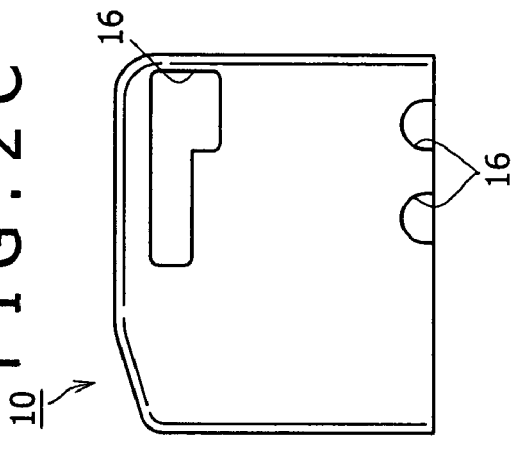
FIG. 2C is an end view showing the structure of the casing constituting the fuel cell according to an embodiment of the present invention.

Now, a fuel cell and an electronic apparatus according to an embodiment will be described in detail below referring to the drawings.

As shown in FIG. 1, the fuel cell 1 includes a casing 10, a control substrate 20, a power generation unit 30, a cooling fan 51, air supply fans 52, 53, a hydrogen purge valve 54, a regulator 55 and a manual valve 56. In addition, the fuel cell 1 receives hydrogen gas supplied from a hydrogen occlusion cartridge 60 containing hydrogen gas occluded therein, and performs power generation.

Figure 2D:
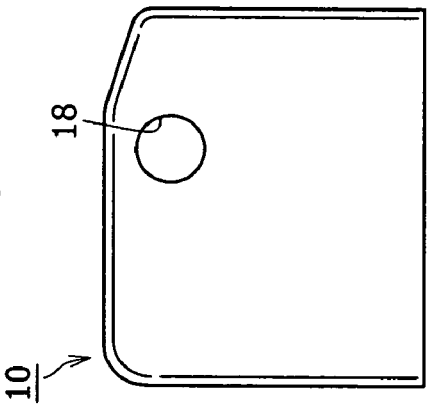
FIG. 2D is an end view showing another end surface showing the structure of the casing constituting the fuel cell according to an embodiment of the present invention.
Figure 2A:
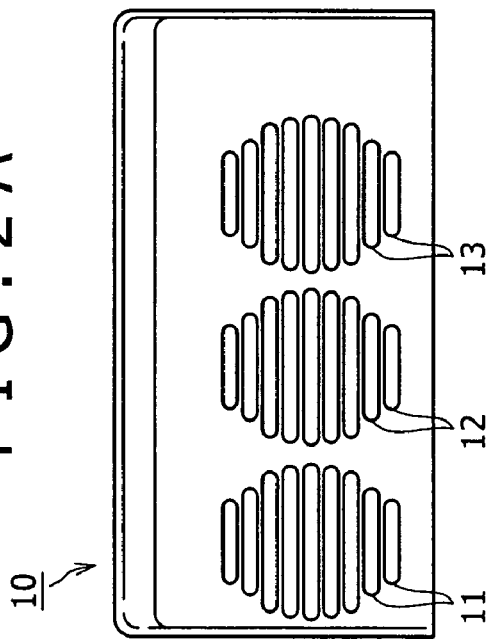
FIG. 2A is a side view showing the structure of a casing constituting the fuel cell according to an embodiment of the present invention.

As shown in FIG. 1 and FIGS. 2A to 2D, the casing 10 is roughly rectangular parallelepiped in outside shape, has a hollow inside so as to cover apparatuses mounted on the fuel cell 1, and is opened on its bottom side. The casing 10 is provided with exhaust ports 11, 12 and 13, and intake ports 14, 15, and an end portion of the upper surface of the casing 10 is an inclined surface extending toward a side surface provided with the exhaust ports 11, 12 and 13. Referring to FIG. 2A, the exhaust ports 11 and the exhaust ports 12, 13 are adjacently formed in one side surface of the casing 10, and air made to flow in the fuel cell 1 for cooling the power generation unit 30 and air after the power generation reaction by the power generation unit 30 are discharged respectively through the exhaust ports 11 and the exhaust ports 12, 13. The exhaust ports 11 are air outlets through which air for releasing heat from radiation fins 33 (described later) is to be discharged. Further, the exhaust ports 11 are opened in a roughly rectangular shape in the side surface of the casing 10, and are formed in plurality in the vertical direction. In addition, the exhaust ports 12, 13 are air outlets through which air supplied to the power generation unit 30 at the time of power generation in the power generation unit 30 is to be discharged, are opened in rectangular shape in the side surface of the casing 10, and are formed in plurality in the vertical direction along the exhaust ports 11. Besides, the exhaust ports 11, 12, 13 are formed so that their longitudinal sizes are sequentially shortened along the upward and downward directions of the side surface of the casing 10.

Figure 2B:
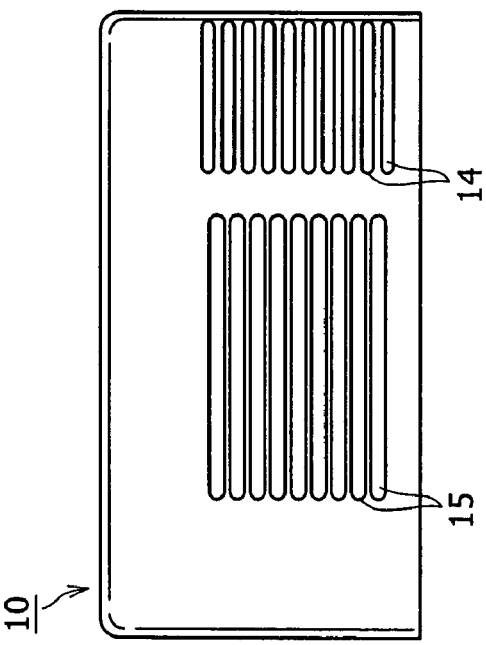
FIG. 2B is a side view showing another side surface showing the structure of the casing constituting the fuel cell according to an embodiment of the present invention.

Further, referring to FIG. 2B, the intake ports 14, 15 are formed in a side surface opposite to the side surface of the casing 10 in which the exhaust ports 11 and the exhaust ports 12, 13 are formed, of the casing 10, and air for cooling the power generation unit 30 and air containing oxygen served to the power generation reaction by the power generation unit 30 are taken through the intake ports 14, 15 into the fuel cell 1. The intake ports 14 are air intake ports through which air for releasing heat from the radiation fins 33 (described later) is to be taken into the fuel cell 1, are opened in a roughly rectangular shape in the side surface of the casing 10, and are formed in plurality in the vertical direction. In addition, the intake ports 15 are air intake ports for taking in air supplied to the power generation unit 30 at the time of power generation by the power generation unit 30, are similarly opened in a roughly rectangular shape in the side surface of the casing 10, and are formed in plurality in the vertical direction along the intake ports 14.

Further, as shown in FIGS. 1, 2C and 2D, one end face of the casing 10 can be provided with connection holes 16 through which wires for transmission of various signals between the fuel cell 1 and the exterior are to be passed. Furthermore, the other end face can also be provided with required connection holes 18.

In addition, as shown in FIG. 1, the control substrate 20 is provided with a control circuit for controlling the apparatuses constituting the fuel cell 1, and the control substrate 20 is disposed on the upper side of the power generation unit 30. The details of the control circuit are not shown in the figure. For example, commands concerning the control of the driving of the cooling fan 51 and the air supply fans 52, 53, or a control circuit for opening and closing operations of the hydrogen purge valve 54, a voltage conversion circuit such as a DC/DC converter for raising the voltage outputted from the power generation unit 30, and further commands concerning the driving of various apparatuses by picking up various environmental conditions such as temperature and humidity detected by sensors (described later) can be performed by circuits mounted on the control substrate 20. Besides, while the control substrate 20 is disposed in the fuel cell 1 in the fuel cell 1 according to this embodiment, the control substrate 20 may be disposed in the exterior of the fuel cell 1; for example, various electronic apparatuses supplied with electric power for driving from the fuel cell 1 may include the control substrate 20.

Figure 3:
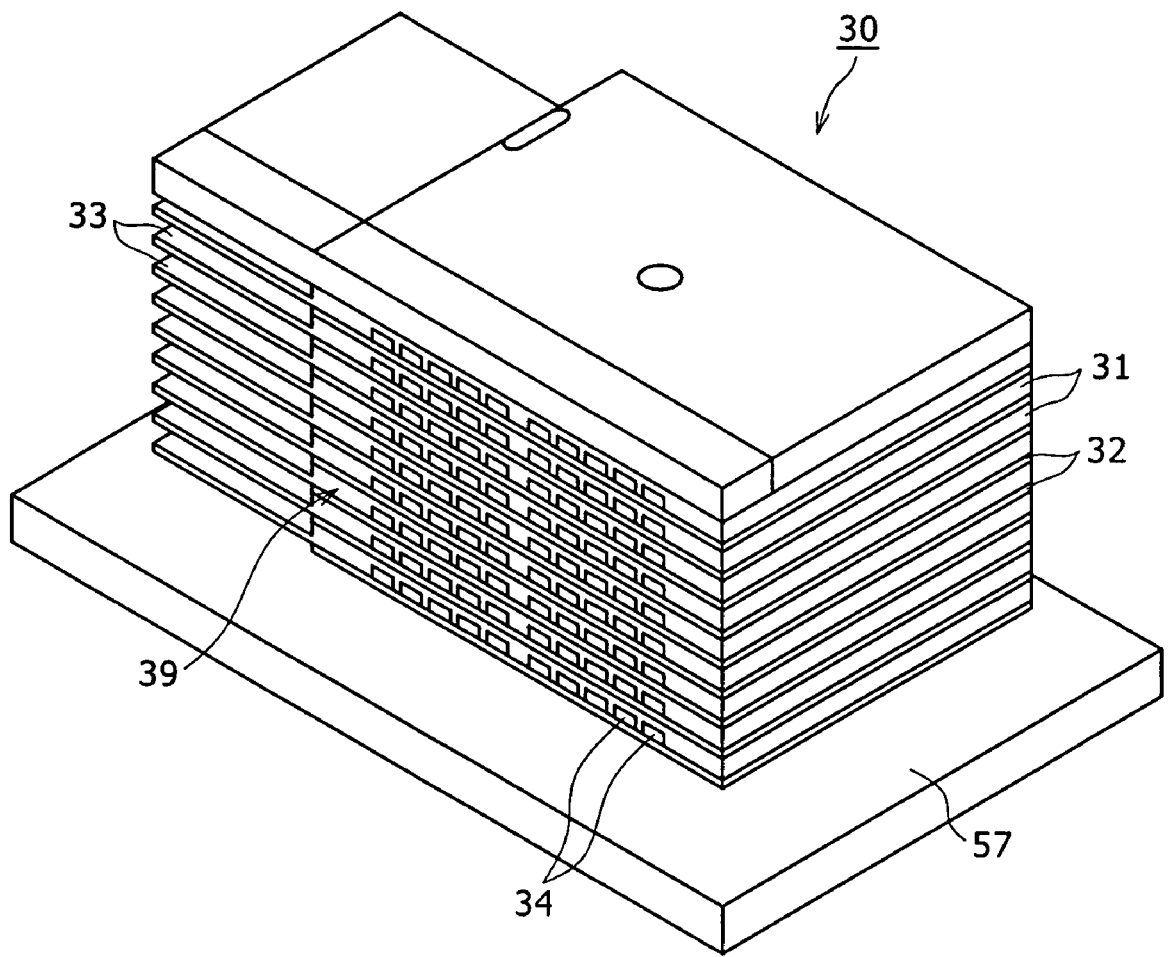
FIG. 3 is a perspective view showing the general appearance of a power generation unit constituting the fuel cell according to an embodiment of the present invention.

Now, the power generation unit 30 will be described in detail below referring to FIGS. 1, 3, 4, 5A and 5B. As shown in FIGS. 1 and 3, the power generation unit 30 has a roughly rectangular parallelepiped shape, wherein a part of the side surface opposite to the side surface 39 fronting on the cooling fan 51 and the air supply fans 52, 53 is cut out in a rectangular shape along the vertical direction of the power generation unit 30, and the power generation unit 30 is placed on a base 57. In addition, the cooling fan 51 and the air supply fans 52, 53 are adjacently disposed along the side surface 39 of the power generation unit 30. The cooling fan 51 thus disposed radiates heat from the radiation fins 33. Besides, the air supply fans 52, 53 are so disposed as to front on opening portions 34, and air is made to flow in the power generation unit 30 through the opening portions 34.

In addition, the power generation unit 30 in this embodiment has joint bodies 32 sandwiched between nine separators 31, and eight power generation cells for performing power generation are connected in series with each other. Each of the power generation cells can output a voltage of about 0.6 V. Therefore, the power generation unit 30 as a whole can output a voltage of 4.8 V. In addition, the power generation unit 30 can pass a current of about 2 A, and the output power is ideally 9.6 W; due to the power conversion efficiency (electronic power for accessories, step-up efficiency) of the control circuit, the actual output power is about 6.7 W, which is about 70% of the ideal output power. However, the output power can be further enhanced, by regulation of the amount of water contained in the joint bodies 32 or smooth supply of hydrogen gas to the power generation unit 30 as will be described later. In addition, the number of the power generation cells constituting the power generation unit 30 is not limited to eight in this embodiment, and the power generation unit 30 may be composed of a required number of power generation cells according to the output power necessary for driving the various electronic apparatuses. The opening portions 34 formed in the separators 31 front on the side surface 39 of the power generation unit 30, and the side surface on the opposite side of the side surface 39 of the power generation unit 30 is also provided with opening portions 40 corresponding respectively to the opening portions 34, as will be described later. Supply and exhaust of air containing oxygen to and from the power generation unit 30 are performed by way of the opening portions 34 and the opening portions 40 fronting on the side surface on the opposite side of the side surface 39 on which the opening portions 34 front.

Figure 4:
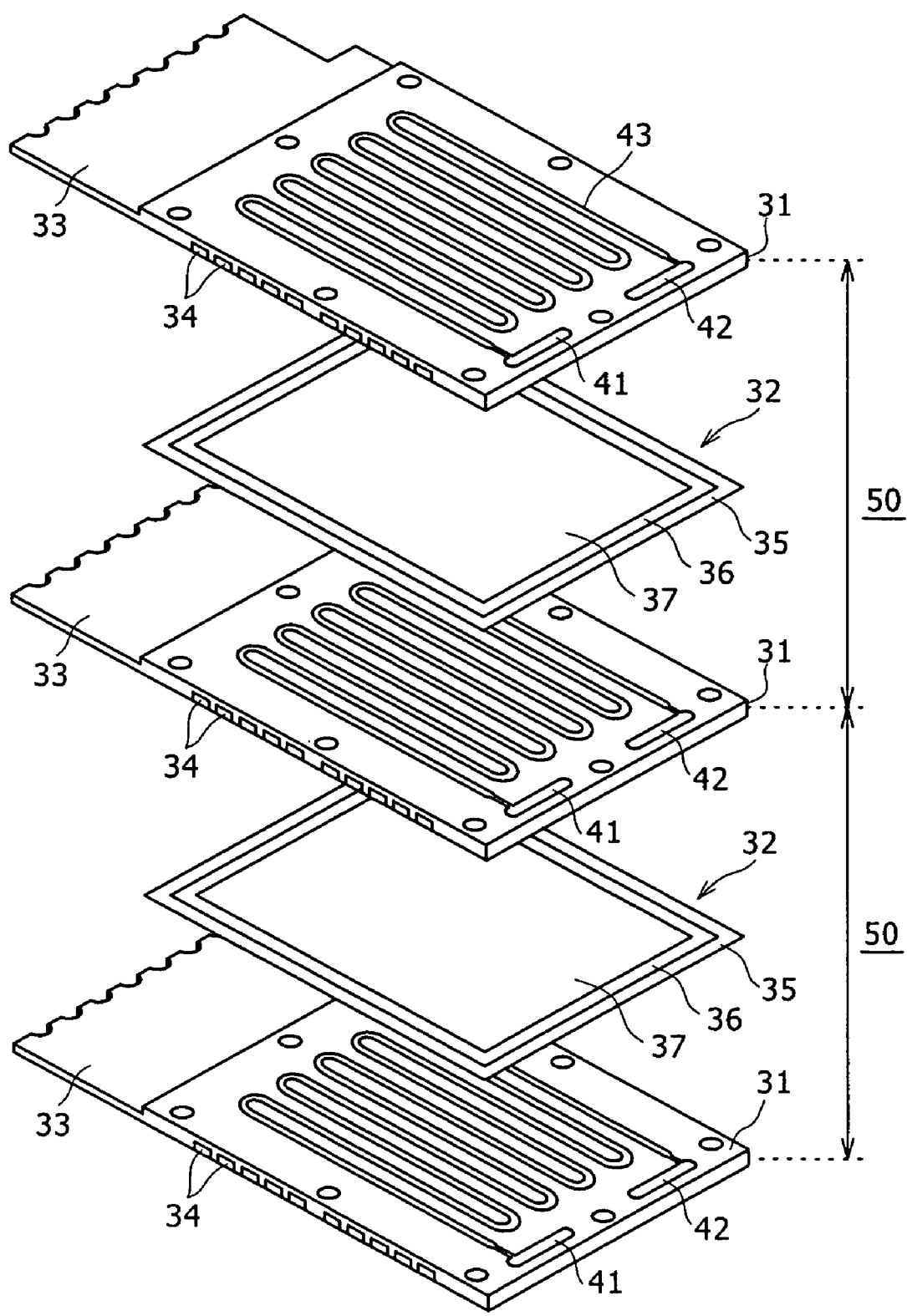
FIG. 4 is an exploded perspective view showing a part of the power generation unit constituting the fuel cell according to an embodiment of the present invention.

Now, the power generation unit 30 will be described more in detail below, referring to FIGS. 4, 5A and 5B. As shown in FIG. 4, the joint body 32 sandwiched between the separators 31 is composed of a solid state polymer electrolyte membrane 36 showing ionic conductivity when moistened, and electrodes 37 clamping the solid state polymer electrolyte membrane 36 therebetween. Further, a sealing member 35 for sealing between the separator 31 and the joint body 32 upon formation of a stack structure is disposed near the peripheral edges of the joint body 32. It suffices for the sealing member 35 to be formed from a material which can sufficiently insulate the peripheral portion of the separator 31 and the peripheral portion of the joint body 32 from each other. As the solid state polymer electrolyte membrane 36, there can be used, for example, a sulfonic acid-based solid polymer electrolyte membrane. As the electrode 37, an electrode supporting thereon a catalyst such as platinum for accelerating the power generation reaction may be used. The power generation cell constituting the power generation unit 30 is composed of two separators 31 and the joint body 32 sandwiched between the separators 31; for example, two power generation cells 50 to be connected in series with each other are shown in FIG. 4.

Figure 5A:
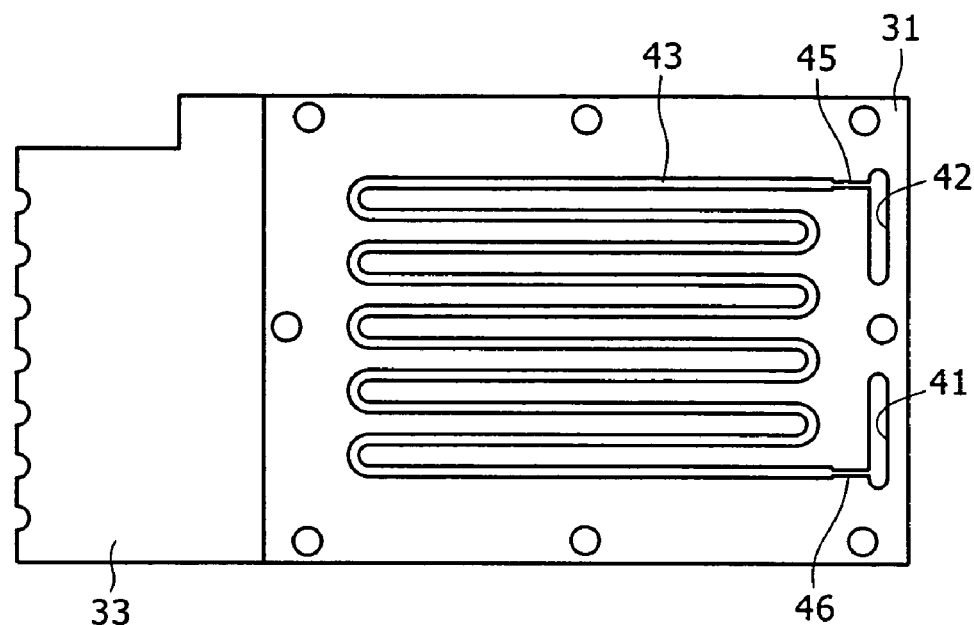
FIG. 5A is a plan view showing the structure of the face side of a separator showing the structure of the separator constituting the fuel cell according to an embodiment of the present invention.
Figure 5B:
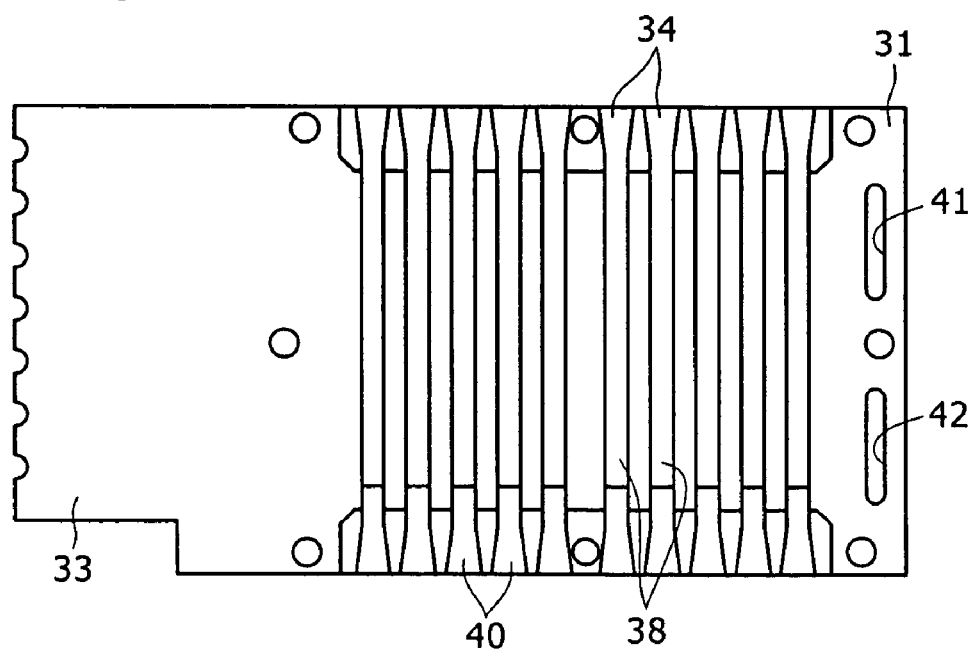
FIG. 5B is a plan view showing the structure on the back side of the separator showing the structure of the separator constituting the fuel cell according to an embodiment of the present invention.

Further, as shown in FIGS. 4, 5A and 5B, the separator 31 constituting the power generation unit 30 includes a conduit 43, a conduit 38 formed on the back side of the surface provided with the conduit 43 of the separator 31, a supply hole 42 and a discharge hole 41 connected to the conduit 43, a connection portion 45 for connection between the conduit 43 and the supply hole 42, a connection portion 46 for connection between the conduit 43 and the discharge hole 41, and a radiation fin 33.

As shown in FIG. 5A, the conduit 43 is an in-plane conduit for causing hydrogen gas as a fuel gas to flow in the plane of the separator 31. The conduit 43 is so formed as to meander in the surface of the separator 31 for enhancing the efficiency of the power generation reaction, and is so shaped as to supply the hydrogen gas to the whole part of the electrode 37. The supply hole 42 is a hydrogen gas conduit in supplying the hydrogen gas from a hydrogen gas storage unit such as the hydrogen occlusion cartridge 60 provided in the exterior of the power generation unit 30 into the conduit 43. The connection portion 45 connects the conduit 43 and the supply hole 42 to each other, for supplying the hydrogen gas into the conduit 43. On the other hand, the connection portion 46 connects the conduit 43 and the discharge hole 41 to each other, for discharging the hydrogen gas after the power generation reaction from the conduit 43. In the separator 31 in this embodiment, the sectional areas of the connection portions 45, 46 are smaller than the sectional area of the conduit 43 upon formation of the stack structure from the separators 31 and the joint bodies 32; for example, the widths of the connection portions 45, 46 are smaller than the width of the conduit 43. Further, the width of the connection portion 45 is smaller than the width of the connection portion 46, and the width of the conduit 43 is smaller on the inlet side than on the outlet side.

In addition, the supply hole 42 and the discharge hole 41 are connected between the separators 31 which are laminated upon formation of the stack structure, for forming a supply passage for supplying the hydrogen gas to each separator 31 and a discharge passage for discharging the hydrogen gas after power generation. When water is accumulated in the conduit 43, the discharge passage is opened to the atmosphere by the hydrogen purge valve 54 which will be described later, whereby a pressure difference is generated in the water accumulated in the conduit 43 between the supply passage side and the discharge passage side, and the water can be discharged by the pressure difference. Further, even when water is accumulated in the conduit 43 of an arbitrary separator 31 upon formation of the stack structure, a pressure difference can be instantaneously generated in only the conduit 43 in which the water has been accumulated, whereby the water can be discharged and the hydrogen gas can be stably supplied to the power generation unit 30.

Further, as shown in FIG. 5B, the conduits 38 are formed on the back side of the surface provided with the conduit 43 of the separator 31, and constitutes passages for causing air containing oxygen to flow into the conduits 38. The conduits 38 are so formed as to extend in the width direction of the separator 31, are opened at side edge portions of the separator 31, and are formed in plurality along the longitudinal direction of the separator 31. In addition, oxygen-containing air is supplied and exhausted into and from the conduits 38 through opening portions 34, 40 by which the conduits 38 are opened respectively at end portions of the separator 31. As in this embodiment, the widths of the opening portions 34, 40 are set larger than the width of the conduits 38. Further, the width of the conduits 38 is narrowed in a taper form along the directions from the opening portions 34, 40 toward the depth of the conduit 38, whereby conduit resistance against air can be reduced so that air can flow smoothly at the time of intake of air into the conduit 38 or discharge of air from the conduit 38. In addition, the opening widths in the height direction of the opening portions 34, 40 are also set greater than that of the conduit 38, and the opening widths are narrowed in a taper form along the depth direction of the conduit 38 in the longitudinal direction and the sideways direction of the opening portions 34, 40, whereby the conduit resistance can be further reduced. Besides, a water-absorptive material having a water-absorbing property is disposed in the conduits 38, and the water-absorptive material is drawn out to the exterior of the separator 31, whereby water accumulated in the conduits 38 can be sucked out to the exterior of the separator 31.

Figure 6A:
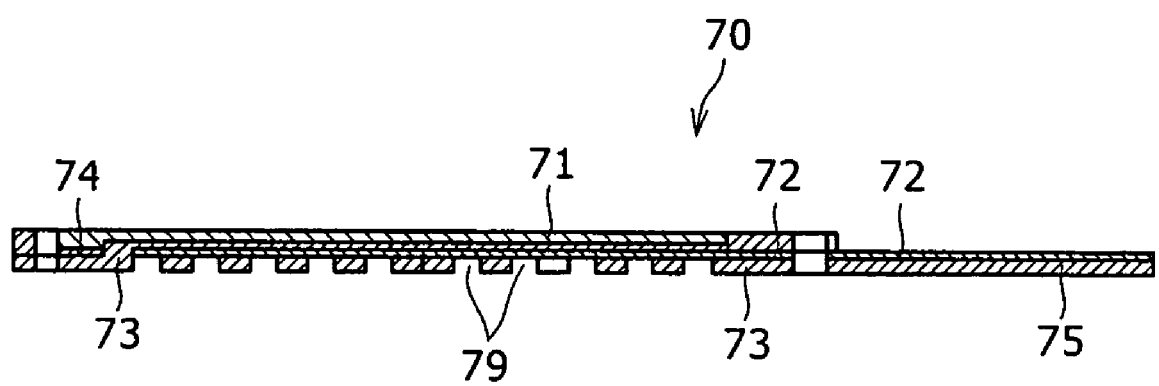
FIG. 6A is a sectional view of a separator showing the structure of an another example of the separator preferable for the fuel cell according to an embodiment of the present invention.
Figure 6B:
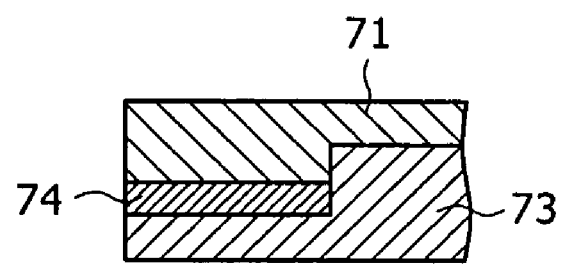
FIG. 6B is an essential part sectional view showing the sectional structure of an end portion of a separator showing a further example of the separator preferable for the fuel cell according to an embodiment of the present invention.

Besides, in the fuel cell 1, a separator 70 having a structure as shown in FIGS. 6A and 6B can also be used. FIG. 6A is a sectional view showing the structure of the separator 70, in which the separator 70 includes an upper-side plate-like portion 71, a heat transfer portion 72 and a lower-side plate-like portion 73, with a sealing member 74 clamped between the upper-side plate-like portion 71 and the lower-side plate-like portion 73 so as to prevent the fuel gas from leaking from the conduits. In addition, the sealing member 74 may be formed of a material higher in thermal conductivity than the material constituting the upper-side plate-like portion 71 and the lower-side plate-like portion 73, whereby the heat-radiating effect for radiating heat from the separator 70 can be enhanced. As the sealing member 74, a sealing member having a member with a high thermal conductivity embedded in a resin is preferably used; for example, such a sealing member as CHO-THERM (commercial name of a product by Taiyo wire cloth co., Ltd.) can be used.

The heat transfer portion 72 is formed to extend to the radiation fin 75, for radiating the heat upon power generation from the separator 70. Further, the heat transfer portion 72 is formed of a material higher in thermal conductivity than the material constituting the upper-side plate-like portion 71 and the lower-side plate-like portion 73, whereby the heat-radiating characteristics of the separator 70 can be enhanced. As the material constituting the heat transfer portion 72, there can be used, for example, copper, which is a metal having a comparatively high thermal conductivity. Further, oxygen-free copper enhanced in corrosion resistance and a copper plate which has been surface treated to enhance corrosion resistance may also be used. The lower-side plate-like portion 73 is provided with conduit 79 extending in the direction perpendicular to the plane of the drawing, as conduits in which oxygen-containing air flows. Besides, as shown in FIG. 6B, the sealing member 74 is sandwiched between the upper-side plate-like portion 71 and the lower-side plate-like portion 73 at end portions of the separator 70, whereby the heat transfer portion 72 is sealed from the exterior, and the heat transfer portion 72 is restrained from deterioration by the power generation reaction.

Figure 7A:
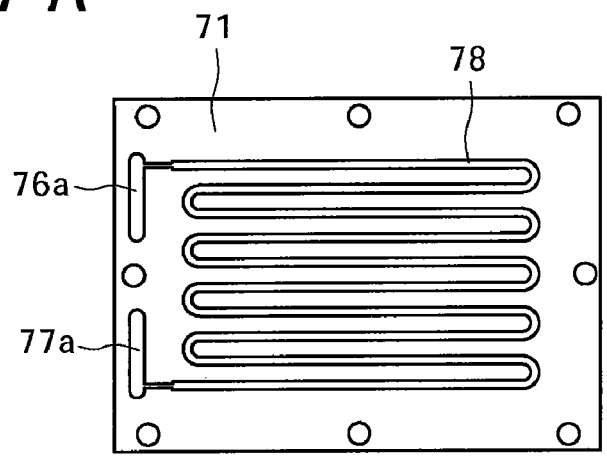
FIG. 7A is a plan view of an upper-side plate-like portion showing yet another example of the separator preferable for the fuel cell according to an embodiment of the present invention.
Figure 7B:
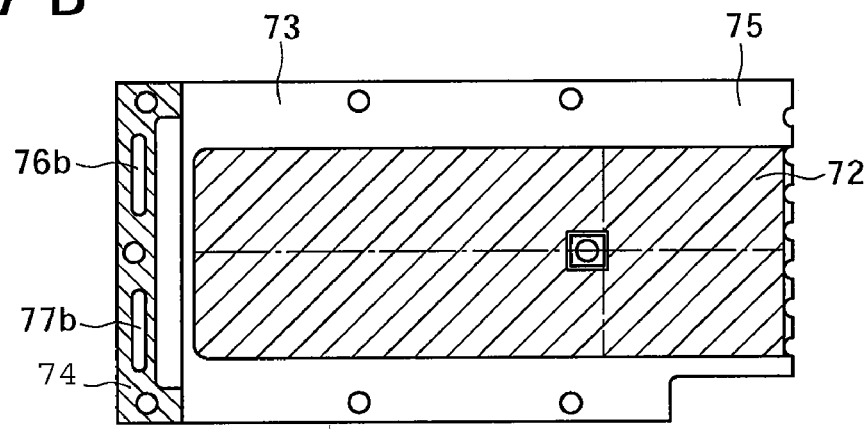
FIG. 7B is a plan view showing the condition where a heat transfer portion is fitted into a lower-side plate-like portion showing a still further example of the separator preferable for the fuel cell according to an embodiment of the present invention.
Figure 7C:
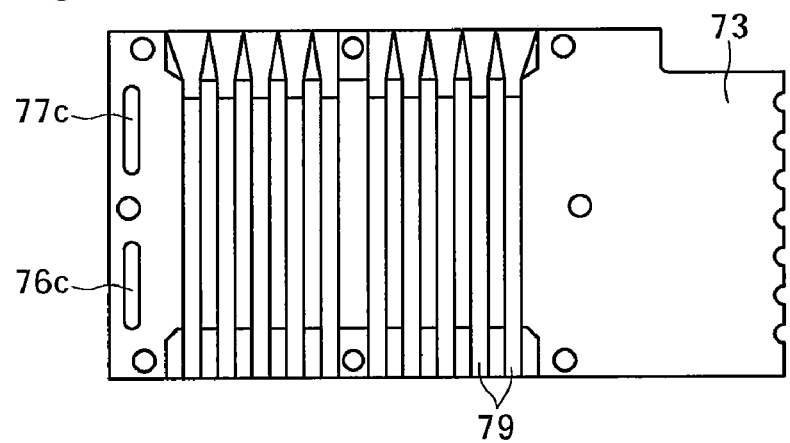
FIG. 7C is a plan view, as viewed from the back side, of the lower-side plate-like portion showing still another example of the separator preferable for the fuel cell according to an embodiment of the present invention.

FIGS. 7A to 7C are plan views of the upper-side plate-like portion 71, the heat transfer portion 72 and the lower-side plate-like portion 73 which constitute the separator 70. As shown in FIG. 7A, the upper-side plate-like portion 71 is provided with a conduit 78 for flow of hydrogen gas. The conduit 78 is formed to meander in the plane so as to permit the hydrogen gas to flow over the entire area of the plane. In addition, the upper-side plate-like portion 71 is provided with a supply hole 77a for supplying the hydrogen gas into the conduit 78 and a discharge hole 76a for discharging the hydrogen gas after the power generation reaction. In addition, as shown in FIG. 7B, the heat transfer portion 72 is roughly plate-like, and is fitted into the lower-side plate-like portion 73. The heat transfer portion 72 is extended to a radiation fin 75, to radiate heat from the separator 70. Further, the sealing member 74 is disposed at an end portion of the lower-side plate-like portion 73 so as to insulate the heat transfer portion 72 from the exterior, and the heat transfer portion 72 is sandwiched by the lower-side plate-like portion 73 and the upper-side plate-like portion 71 to form the separator 70 as an integral body. In the lower-side plate-like portion 73, the sealing member 74 is provided with a supply hole 77b and a discharge hole 76b matched in position to the supply hole 77a and the discharge hole 76a. Further, the lower-side plate-like portion 73 are also provided with hole portions matched to the supply holes 77a, 77b and the discharge holes 76a, 76b, whereby a supply hole and a discharge hole which are integrated upon assembly of the separator 70 can be formed. Furthermore, as shown in FIG. 7C, a conduit 79 for flow of oxygen-containing air is provided on the back side of the lower-side plate-like portion 73. Also, a supply hole 77c for supplying hydrogen gas into the conduit 78 and a discharge hole 76c for discharging the hydrogen gas are provided.

Now, the flow of air supplied and exhausted by the fuel cell 1 in this embodiment will be described in detail below, referring to FIG. 8. As shown in FIG. 8, the fuel cell 1 has the cooling fan 51 and the air supply fans 52, 53 adjacently disposed along the side surface 39, on which the opening portions 34 front, of the power generation unit 30, as has been described above. Further, the fuel cell 1 has a temperature sensor 64 for detecting the temperature of air taken in from the exterior of the fuel cell 1 by the cooling fan 51 and a humidity sensor 65 for detecting the humidity of the air, and a temperature sensor 61 for detecting the temperature of air discharged from the power generation unit 30 by the air supply fans 52, 53 and a humidity sensor 62 for detecting the humidity of the air. In addition, the power generation unit 30 has a temperature sensor 63 for detecting the temperature of the power generation unit 30.

As indicated by arrows in the figure, the cooling fan 51 causes the air taken in through the intake ports 14 to flow from the intake ports 14 to the exhaust ports 11, and discharges the air to the exterior of the fuel cell 1. The cooling fan 51 is disposed between the intake ports 14 and the exhaust ports 11, and the radiation fin 33 disposed between the cooling fan 51 and the intake ports 14 radiates heat by the function of the air made to flow by the cooling fan 51. In addition, the flow of the air is not limited to the vicinity of the radiation fin 33, and the air may be made to flow in the entire region of the inside of the fuel cell 1 to thereby cool the power generation unit 30.

The air supply fans 52, 53 causes air to flow to the intake ports 15, the power generation unit 30 and the exhaust ports 12, 13. The air supply fans 52, 53 causes the air taken in through the intake ports 15 to flow to the power generation unit 30, and discharges the air discharged after the power generation reaction in the power generation unit 30 to the exterior of the fuel cell 1 through the exhaust ports 12, 13. The power generation unit 30 is provided with the conduit 38 and the opening portions 34, 40 as has been described above referring to FIGS. 3, 5A and 5B, and the air supply fans 52, 53 form the flows of air from the intake ports 15 to the conduit 38 and the exhaust ports 12, 13 as indicated by arrows in the figure. In addition, the flow of air generated by the cooling fan 51 and the flows of air generated by the air supply fans 52, 53 can be made to be airflows independent from each other. Therefore, by driving the cooling fan 51 and the air supply fans 52, 53 independently, it is possible to independently perform the cooling of the power generation unit 30 and the supply and discharge of air to and from the power generation unit 30. The layout of the cooling fan 51 and the air supply fans 52, 53 in the fuel cell 1 in this embodiment is not limitative; the cooling fan 51 and the air supply fans 52, 53 may be so disposed as to front on opening portions formed in side surfaces of a plurality of power generation units so as to supply and exhaust air, whereby the supply and exhaust of air can be performed collectively for the plurality of power generation units. Furthermore, air can be made to flow in the reverse direction by reversely rotating the cooling fan 51 and the air supply fans 52, 53.

The temperature sensors 61, 64, the humidity sensors 62, 65 and the temperature sensor 63 are provided for respectively detecting the temperature and humidity of air taken in through the intake ports 14, the temperature and humidity of air discharged through the exhaust ports 12, 13, and the temperature of the power generation unit 30. The temperature sensor 63 is disposed in the vicinity of a roughly central portion of the power generation unit 30, and detects the temperature of the power generation unit 30 at the time of power generation in the power generation unit 30. The temperature sensor 64 and the humidity sensor 65 are disposed in the vicinity of the intake ports 14 as not to block the conduit for the air taken in through the intake ports 14. In addition, the temperature sensor 61 and the humidity sensor 62 are disposed on the air outlet side of the power generation unit 30 fronting on the air supply fans 52 and 53 so as not to hinder the flow of air. The driving of the cooling fan 51 is controlled based on the data concerning the temperature of the power generation unit 30 detected by the temperature sensor 63, and the power generation unit 30 is driven under a preferable temperature condition. Besides, the fuel cell 1 may include a pressure sensor for detecting the pressure of air supplied and exhausted, in addition to the temperature and humidity sensors.

Further, the relative humidity of the air taken in through the intake ports 14 is calculated based on the temperature and humidity detected by the temperature sensor 64 and the humidity sensor 65, and the relative humidity of the air discharged through the exhaust ports 12, 13 is calculated based on the temperature and humidity detected by the temperature sensor 61 and the humidity sensor 62. By determining the difference between the relative humidity of the air taken in through the intake ports 15 and the relative humidity of the air exhausted through the exhaust ports 12, 13, it is possible to calculate the quantity of water discharged from the fuel cell 1. Besides, since the temperature sensors 61, 64 and the humidity sensors 62, 65 are so disposed as not to hinder the flow of air, the power generation by the power generation unit 30 can be performed without any trouble.

Furthermore, the quantity of water produced by the power generation reaction can be calculated based on the output power generated by the power generation unit 30. Therefore, by determining the difference between the quantity of water discharged from the fuel cell 1 and the quantity of water generated by the power generation reaction, it is possible to calculate the amount of water remaining in the power generation unit 30. As has been described above, a stable power generation reaction can be performed by setting the joint bodies 32 constituting the power generation unit 30 into an appropriately moistened state; therefore, stable power generation can be achieved by driving the air supply fans 52, 53 on the basis of the data concerning the amount of water remaining in the power generation unit 30. For example, where the amount of water remaining in the power generation unit 30 is excessively large, the rotating speeds of the air supply fans 52, 53 are raised, whereby the excessive water can be discharged from the power generation unit 30 together with air. In addition, it is possible not only to independently drive the cooling fan 51 for controlling the temperature of the power generation unit 30 and the air supply fans 52, 53 for controlling the amount of water remaining in the power generation unit 30 but also to make independent the flow of air by the cooling fan 51 and the flows of air by the air supply fans 52, 53, so that the control of the amount of water remaining in the power generation unit 30 and the restraint of the temperature rise in the power generation unit 30 can be performed accurately.

Figure 9:
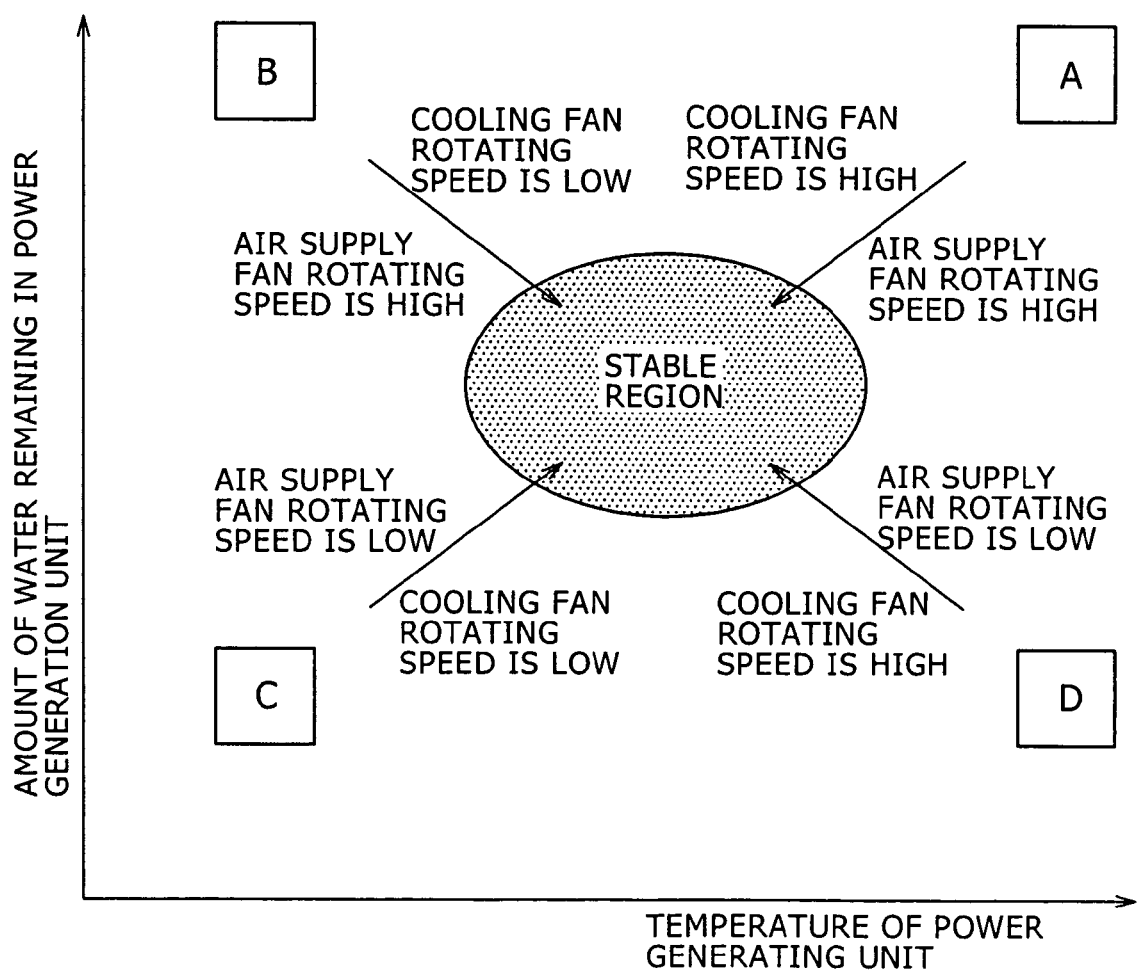
FIG. 9 illustrates a control method for controlling the temperature of the power generation unit and the amount of water remaining in the power generation unit in the fuel cell according to an embodiment of the present invention.

Further, the control of the temperature of the power generation unit 30 and the amount of water remaining in the power generation unit 30 will be described in detail, referring to FIG. 9. In the figure, the axis of abscissas indicates the temperature of the power generation unit 30, and the axis of ordinates indicates the amount of water remaining in the power generation unit 30. By controlling the driving of the cooling fan 51 and the air supply fans 52, 53, the temperature of the power generation unit 30 and the amount of water remaining in the power generation unit 30, which vary with time during the power generation, are controlled to within the stable region located in the vicinity of the center of the figure.

For example, the environmental condition represented by A in the figure is an environmental condition in which the temperature of the power generation unit 30 is higher and the amount of water remaining in the power generation unit 30 is larger as compared with the environmental condition in the stable region, and it is necessary in the environmental condition A to cool the power generation unit 30 and to reduce the amount of water remaining there. In such a case, the amount of water remaining in the power generation unit 30 is reduced by raising the rotating speeds of the air supply fans 52, 53 and the power generation unit 30 is further cooled by raising the rotating speed of the cooling fan 51, whereby the temperature and the water amount are controlled from the environmental condition A into the stable region in which stable power generation can be achieved.

The environmental condition represented by B in the figure is an environmental condition in which the temperature of the power generation unit 30 is lower and the amount of water remaining in the power generation unit 30 is larger as compared with the stable condition. In such a case, the amount of water remaining in the power generation unit 30 is reduced by raising the rotating speeds of the air supply fans 52, 53 and the cooling of the power generation unit 30 is suppressed by lowering the rotating speed of the cooling fan 51, whereby the temperature of the power generation unit 30 and the amount of water therein are controlled from the environmental condition B into the stable region in which stable power generation can be achieved.

The environmental condition represented by C in the figure is an environmental condition in which the temperature of the power generation unit 30 is lower and the amount of water remaining in the power generation unit 30 is smaller as compared with the stable condition. In such a case, the discharge of water produced in the power generation unit 30 is reduced by lowering the rotating speeds of the air supply fans 52, 53 and the cooling of the power generation unit 30 is suppressed by lowering the rotating speed of the cooling fan 51. By such a control of the driving of the air supply fans 52, 53 and the cooling fan 51, the temperature of the power generation unit 30 and the amount of water therein are controlled from the environmental condition C into the stable region in which stable power generation can be achieved.

The environmental condition represented by D in the figure is an environmental condition in which the temperature of the power generation unit 30 is higher and the amount of water remaining in the power generation unit 30 is smaller as compared with the stable condition. In such a case, the discharge of water produced in the power generation unit 30 is reduced by lowering the rotating speeds of the air supply fans 52, 53 and the power generation unit 30 is further cooled by raising the rotating speed of the cooling fan 51. By such a control of the driving of the air supply fans 52, 53 and the cooling fan 51, the temperature of the power generation unit 30 and the amount of water therein are controlled from the environmental condition D into the stable region in which stable power generation can be achieved.

By driving the air supply fans 52, 53 and the cooling fan 51 according to the temperature of the power generation unit 30 and the amount of water remaining in the power generation unit 30 in this manner, it is possible to perform stable power generation, without causing a trouble in power generation, such as dry-up.

Now, the hydrogen purge valve 54, the regulator 55 and the manual valve 56 will be described below, referring to FIGS. 1, 4, 5A and 5B. As shown in FIG. 1, the hydrogen purge valve 54, the regulator 55 and the manual valve 56 are adjacently laid out along an end face of the power generation unit 30. In the fuel cell 1 in this embodiment, a region for arranging various apparatuses can be secured on the end face side of the power generation unit 30, and the apparatuses for stable driving of the fuel cell 1 can be contained in a compact form.

The hydrogen purge valve 54 as a water discharge means for discharging the water accumulated in the conduit 43 can discharge the water from the conduit 43 by opening to the atmosphere the discharge passage connected to the conduit 43. When the conduit 43 is opened to the atmosphere, a pressure difference is generated between the pressure exerted on the water accumulated in the conduit 43 by the hydrogen gas on the supply passage side and the pressure exerted by the atmospheric air on the discharge passage side. Due to the pressure difference, the water accumulated in the conduit 43 is discharged from the conduit 43. With the pressure difference thus generated between the supply passage side on which the hydrogen gas is supplied and the discharge passage side opened to the atmosphere via the hydrogen purge valve 54, it is possible to discharge water from an arbitrary conduit 43 in which water has been accumulated to make it difficult for the hydrogen gas to flow therethrough, even in the case where the power generation unit 30 has a stack structure; therefore, it is possible to cause the hydrogen gas to flow smoothly in the conduits 43 of all the separators 31. In addition, the hydrogen purge valve 54 can be driven by a drive system using an electromagnetic force, for example, or electric power for driving the hydrogen purge valve 54 may be supplied from the power generation unit 30.

Besides, the regulator 55 as a pressure control means for controlling the pressure of the hydrogen gas regulates the pressure of the hydrogen gas supplied from the hydrogen occlusion cartridge 60 to a required pressure, thereby feeding out the hydrogen gas to the power generation unit 30. For example, where the pressure of the hydrogen gas supplied from the hydrogen occlusion cartridge 60 is about 0.8 to 1.0 MPa, the regulator 55 can supply the hydrogen gas to the power generation unit 30 while lowering the pressure of the hydrogen gas to a pressure of about 0.05 to 0.10 MPa.

Further, the manual valve 56 as a gas supply means for supplying the hydrogen gas to the power generation unit 30 opens the conduit for supplying the hydrogen gas from the hydrogen occlusion cartridge 60 to the power generation unit 30 at the time of performing power generation in the power generation unit 30. The hydrogen purge valve 54, the regulator 55 and the manual valve 56 are important for causing the fuel cell 1 to perform stable power generation, and these apparatuses are contained in the fuel cell 1 in a compact form, whereby the overall size of the fuel cell 1 can be reduced.

Now, a specific structure of the fuel cell apparatus in this embodiment will be described below referring to FIGS. 10 to 14. First, FIGS. 10 to 12 are respectively a back view, a side view, and a face view of a separator portion in this embodiment.

Figure 10:
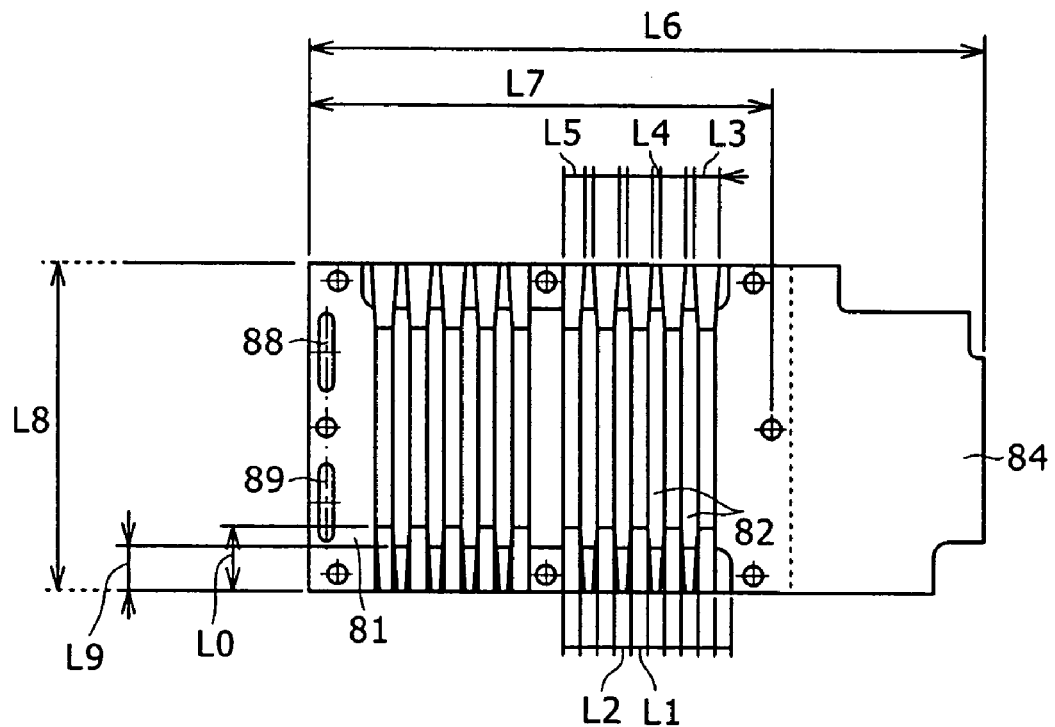
FIG. 10 illustrates a specific structure of the separator according to the present embodiment, and is a plan view sowing the structure of the separator as viewed from the face side.
Figure 11:
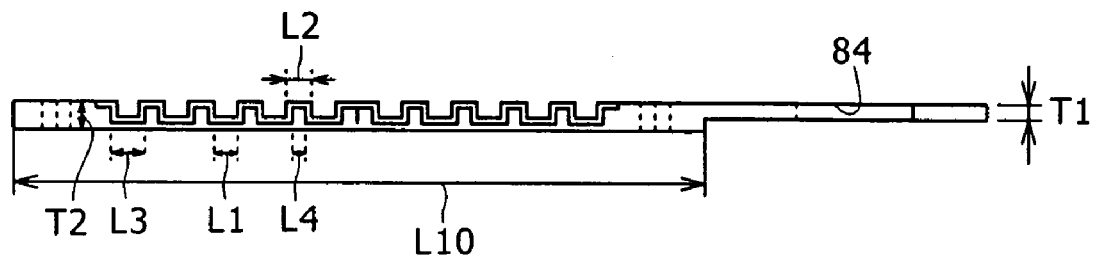
FIG. 11 illustrates a specific structure of the separator according to the present embodiment, and is a side view showing the structure of the separator as viewed from a lateral side.
Figure 12:
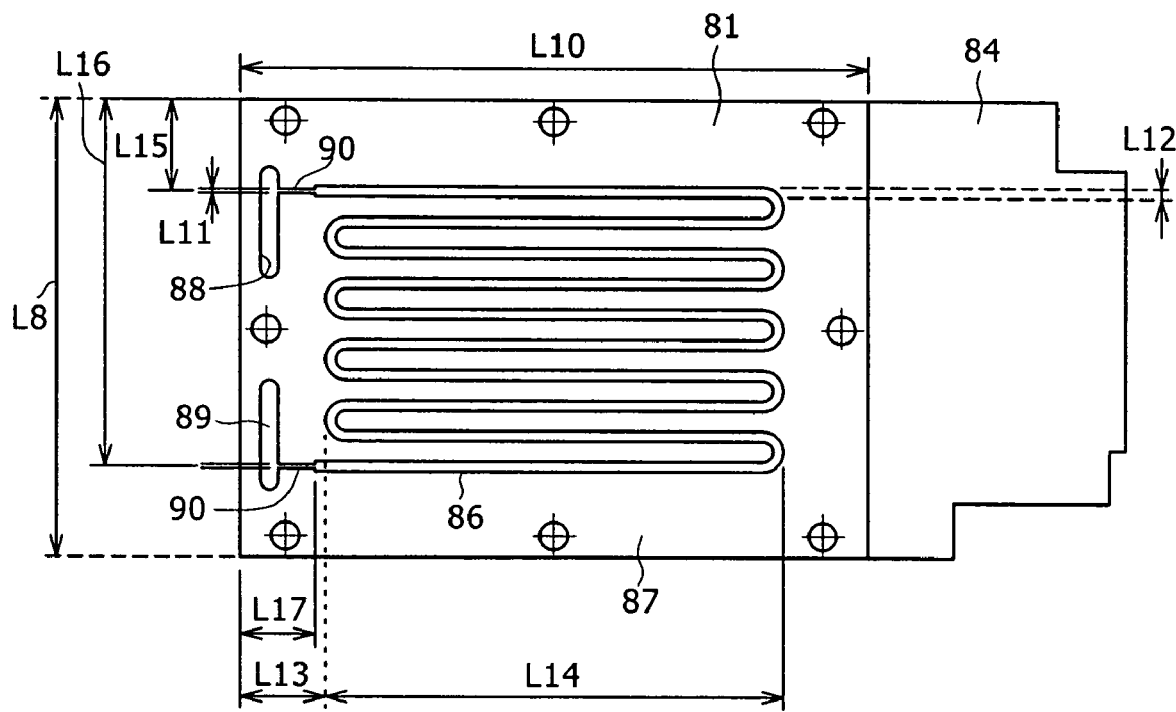
FIG. 12 illustrates a specific structure of the separator according to an embodiment of the present embodiment, and is a plan view showing the structure of the separator as viewed from the back side.

As shown in FIGS. 10 to 12, the separator 81 is provided on its back side with grooves 83 for constituting conduits for oxygen, and on its face wide with a groove 86 for constituting a conduit for hydrogen. Incidentally, the separators 81 may be disposed with the back side on the face side, when laminated with the power generation body (not shown) sandwiched therebetween.

As shown in FIG. 10, the separator 81 is provided in its oxygen supply side surface with a plurality of grooves 83 extended rectilinearly in the width direction of the separator 81, and the grooves 83 are extended in parallel to each other, so that the grooves 83 and rib portions 82 are alternately located along the longitudinal direction of the separator 81. The length L6 in the longitudinal direction of the separator 81 formed in a roughly flat plate-like shape is 79.5 mm, and the width L8 orthogonal thereto is 41 mm. The grooves 83 are opened to be wider at both end portions of the separator 81. As for specific sizes, in FIG. 10, the width L1 of a central portion extended in parallel of the groove 83 is 2 mm, and the width L2 of the rib portion 82 adjacent to the groove 83 is also 2 mm. The groove 83 is opened in a tapered shape at both end portions where they are wider, and the start position L0 of the tapered portion which is formed also in the thickness direction of the separator 81 is 8 mm from the end portion, and the taper is inclined at an angle of 2.15° starting from the start position L0. At both end portions where the groove 83 is wider, the opening width is enlarged by about 1 mm in the in-plane direction, the width L3 at the end portion of the groove 83 is 3 mm, while the width L4 of the rib portion 82 adjacent thereto is tapered to 1 mm. Plate-like bridges are incorporated at two locations in a portion, located at a distance of 5.5 mm from the end portion, of the rib portion 82. Incidentally, the opening width L5 in the vicinity of the center is 2.5 mm due to the influence of screw holes, and the width L10 in the longitudinal direction of a power generation body holding region continuous with the heat radiation portion 84 is 56.5 mm (see FIG. 11), and the interval L7 between the screw holes is 54.5 mm.

Next, as shown in FIG. 11, as for the sizes in the thickness direction of the separator 81, the thickness T1 of the heat radiation portion 84 is 1.3 mm, and the thickness T2 in the power generation holding region where the grooves 83, 86 are formed is 2.3 mm.

As shown in FIG. 12, the hydrogen supply side surface 87 of the separator 81 is provided with the groove 86 extended in a meandering pattern for going and returning five times between a hydrogen supply hole 89 and a hydrogen discharge hole 88, the meandering groove 86 has a depth of 0.6 mm and a width L12 of 1.0 mm, and the radius of curvature at the turning-back portions is 0.9 mm (inside radius), 1.9 mm (outside radius). The groove 86 becomes thinner at connection portions for connection with the hydrogen supply hole 89 and the hydrogen discharge hole 88; the hydrogen supply hole 89 and the hydrogen discharge hole 88 are sized to have a width of 1.5 mm, with the position of 2.25 mm from the end portion in the longitudinal direction of the separator 81 as a center, and the start position L17 of the thinner groove from the end portion in the longitudinal direction of the separator 81 is 6 mm, so that the length is about 3 mm. At the connection portions 90, the groove connected to the hydrogen supply hole 88 has a width L11 of 0.5 mm and a depth of 1.2 mm, and the groove connected to the hydrogen supply hole 89 has a width of 0.5 mm and a depth of 0.3 mm. The position L15 of the connection portion 90 on the side of the hydrogen discharge hold 88 from the end portion in the width direction of the separator 81 is 7.9 mm in terms of center position, and the position L16 of the connection portion 90 on the side of the hydrogen supply hole 89 is 33.1 mm in terms of center position. Of the groove 86 extended in the meandering pattern for going and returning five times, the turning-back position L13 from the end portion on the side closer to the hydrogen supply hole 89 and the hydrogen discharge hole 88 in the longitudinal direction of the separator 81 is 7 mm. Besides, the length L14 between the turning-back portions of the groove 86 is 42 mm.

Figure 13:
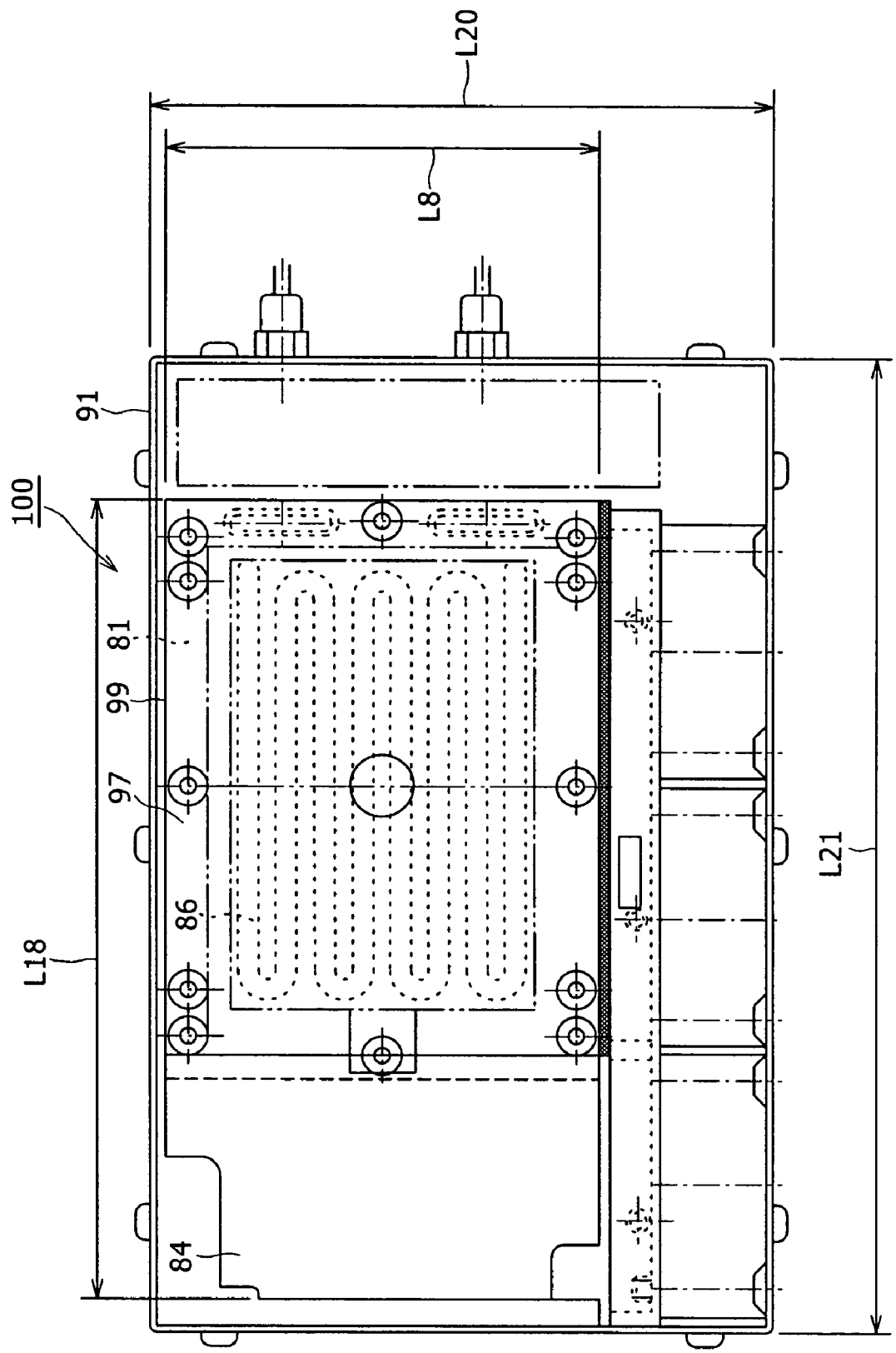
FIG. 13 is a plan view showing a specific structure of a fuel cell apparatus according to an embodiment of the present embodiment.
Figure 14:
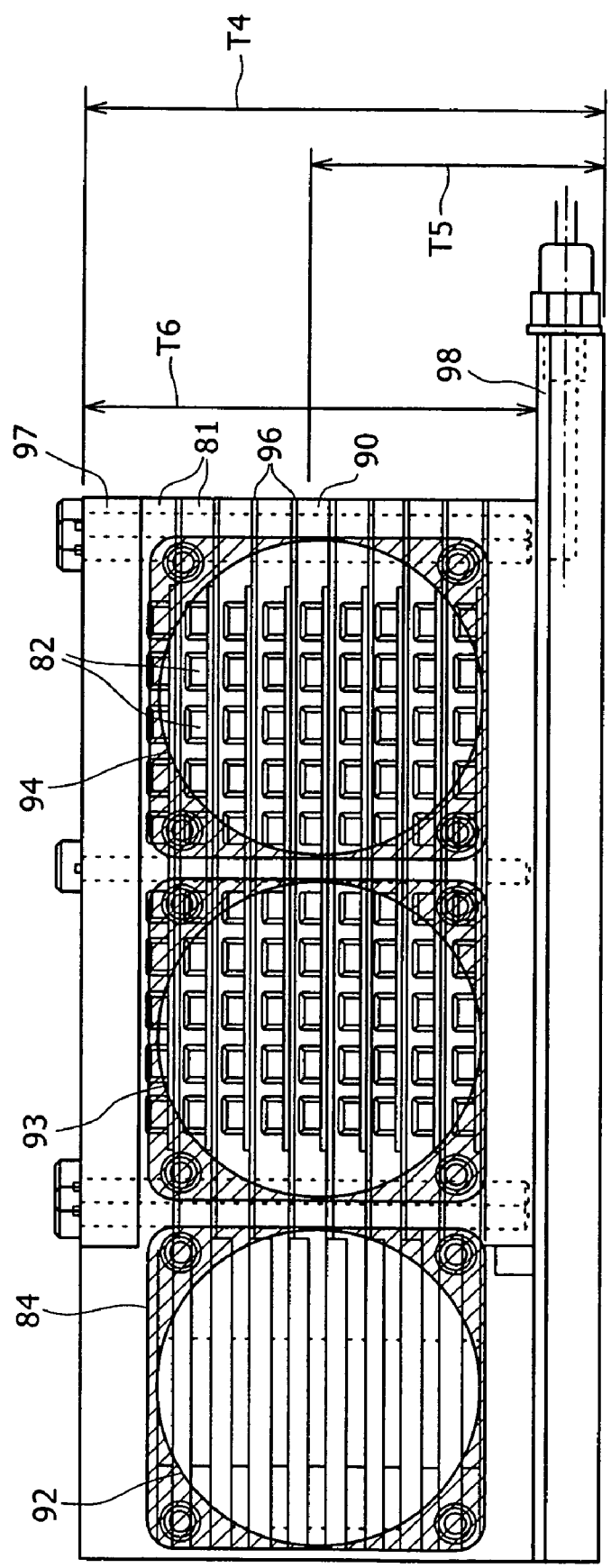
FIG. 14 is a side view showing a specific structure of the fuel cell apparatus according to an embodiment of the present embodiment.

Now, the structure of the fuel cell apparatus in this embodiment will be described more in detail below, referring to FIGS. 13 and 14. FIG. 13 is a plan view of the fuel cell apparatus 100 in this embodiment. The fuel cell apparatus 100 has a stack structure in which the separators 81 and the power generation bodies are stacked. In FIG. 13, the plate-like portion disposed at the uppermost portion constituting the stack structure is seen through, and the groove 86 formed in the surface of the separator in the region where the power generation unit 99 is disposed is indicated by broken lines in the figure. The length L18 obtained by summing up the size in the longitudinal direction of the separator for forming the power generation unit 99 and the size in the longitudinal direction of the heat radiation portion extended in the longitudinal direction from the separator is 78 mm, and the width L8 of the separator is 41 mm. An end portion of a heat radiation portion 84 is rectilinear in the figure, but may be provided with notches or cutouts for passing wires therethrough. A casing 91 for constituting the fuel cell apparatus 100 and for containing the units inclusive of the power generation unit 99 has a length L21 in the longitudinal direction of 95.5 mm and a width L20 of 57 mm. Since the length L21 in the longitudinal direction and the width L20 of the casing 91 are the length in the longitudinal direction and the width of the fuel cell apparatus 100, the fuel cell apparatus 100 in this embodiment has a length in the longitudinal direction on plane of 93.5 mm and a width of 57 mm.

Further, the structure of the fuel cell apparatus 100 in this embodiment will be described specifically, referring to FIG. 14. Incidentally, FIG. 14 is a side view, as viewed from a lateral side, of the fuel cell apparatus 100 in the condition where the casing 91 has been removed. The power generation unit 99 has a stack structure in which nine separators 81 are stacked, with the power generation bodies 96 sandwiched therebetween, and has a structure in which eight power generation cells are connected in series with each other. The power generation unit 99 is disposed on a base 98 which constitutes a bottom portion of the fuel cell apparatus 100. The height T4 from the bottom surface of the base 98 to the surface of a plate-like portion disposed at the uppermost portion of the power generation unit 99 is 34.62 mm. In addition, the height T5 from the bottom surface of the base 98 to the center in the thickness direction of the separator 81 located at a central portion of the power generation unit 99 is 17.78 mm, which is approximately equal to the heights from the bottom surface of the base 98 to the centers of a cooling fan 92 and air supply fans 93, 94 disposed on the side of a side surface of the power generation unit 99. The height T6 of the power generation unit 99 obtained by summing up the thickness of the plate-like portion 97, and the stacked separators 81 and power generation bodies 96 is 29.62 mm. The height of the cooling fan 92 is approximately equal to the height between the heat radiation portion 84 disposed at the uppermost portion of the power generation unit 99 and the heat radiation portion 84 disposed at the lowermost portion, so that air for cooling can be supplied to the entire part of the heat radiation portions 84. The height of the air supply fans 93, 94 is approximately equal to the height between the grooves 82 at the uppermost portion of the power generation unit 99 and the grooves 82 at the lowermost portion, so that oxygen-containing air can be sufficiently supplied to the entire part of the grooves 82.

As has been described above, the fuel cell according to the present invention can contain in a compact form the various apparatuses for driving the fuel cell, and is preferable for use as a power source for supplying electric power for driving a portable electronic apparatus such as a notebook type personal computer, a cellular phone and a PDA. In addition, the application of the fuel cell 1 according to the present invention is not limited to these portable electronic apparatuses, and the fuel cell 1 can be utilized as a power source for driving various electronic apparatuses.

INDUSTRIAL APPLICABILITY

According to the fuel cell of the present invention in an embodiment, by performing restraint of the temperature rise in the power generation unit and control of the amount of water remaining in the power generation unit, it is possible to achieve stable power generation without causing a trouble in power generation, such as dry-up. Further, the control of the temperature of the power generation unit and the control of the amount of water remaining in the power generation unit can be independently performed accurately, so that it is possible to provide a fuel cell which is high in reliability. In addition, according to such a fuel cell, various apparatuses for performing power generation can be contained in the fuel cell in a compact form, so that the fuel cell can be reduced in size.

Furthermore, according to the electronic apparatus of the present invention in an embodiment, driving by a fuel cell can be achieved even for a portable electronic apparatus by mounting thereon the fuel cell sized for portable use, and the fuel cell can be mounted on a required electronic apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell system comprising:
a power generation unit provided with a conduit for an oxidant gas containing at least oxygen;
a casing for covering at least said power generation unit;
a heat radiation unit including a plurality of radiating fins, the heat radiation unit connected to said power generation unit so as to radiate heat from said power generation unit;
a separator included in the power generating unit, the separator including
an upper-side portion including fuel conduits,
a lower-side portion including oxidant gas channels, and
a heat transfer portion formed on the lower-side portion and formed in an area corresponding to positions of the fuel conduits and the oxidant gas channels and extending beyond an outer edge of the upper-side portion so as to be formed on surfaces of the radiating fins of said heat radiation unit;
a gas flow unit configured to suck said oxidant gas into a first intake port disposed on a first surface of said casing;
a cooling unit configured to suck said oxidant gas into a second intake port disposed on the first surface of said casing and adjacent to said first intake port;
a plurality of temperature detectors which detect a temperature of the power generation unit, the heat radiation unit, and the oxidant gas; and
a humidity detector which detects a humidity of the oxidant gas,
wherein an amount of moisture located inside the power generation unit and a temperature of the power generation unit are determined based on the temperatures detected by the plurality of temperature detectors and the humidity detected by the humidity detector,
wherein when the amount of moisture located inside the power generation unit and/or the temperature of the power generation unit deviate from a stable zone of the power generation unit having a proper moisture content and appropriate temperature, the cooling unit is driven independently from said gas flow unit to return a state of the power generation unit to the stable zone, and
wherein when the amount of moisture located inside the power generation unit is superfluous, the superfluous moisture is discharged with air by the gas flow unit.

2. The fuel cell system as set forth in claim 1, wherein said power generation unit comprises:
a joint body including a conductor having ionic conductivity and electrodes opposed to each other with said conductor therebetween; and
a plurality of the separators for clamping said joint body therebetween.

3. The fuel cell system as set forth in claim 2, wherein said conductor includes a proton conductor.

4. The fuel cell system as set forth in claim 2, wherein said separators each have a water suction unit configured to suck and remove water from said conduit.

5. The fuel cell system as set forth in claim 2, wherein said power generation unit has a stack structure in which said joint body and said separators are laminated.

6. The fuel cell system as set forth in claim 5, wherein said separators each have an in-plane conduit for supplying a fuel into a plane where said separator and said joint body make contact with each other.

7. The fuel cell system as set forth in claim 6, wherein a sectional area of a connection portion where said in-plane conduit is connected to said supply passage is smaller than a sectional area of said in-plane conduit.

8. The fuel cell system as set forth in claim 6, wherein a sectional area of a connection portion where said in-plane conduit is connected to said discharge passage is smaller than a sectional area of said in-plane conduit.

9. The fuel cell system as set forth in claim 6, wherein a sectional area of a connection portion where said in-plane conduit is connected to said supply passage is smaller than a sectional area of a connection portion where said in-plane conduit is connected to said discharge passage.

10. The fuel cell system as set forth in claim 6, further comprising a water discharge unit configured to discharge water from said in-plane conduit by generating a difference in pressure on said water between the supply passage side and the discharge passage side, in said in-plane conduit in which said water is accumulated.

11. The fuel cell system as set forth in claim 10, wherein said water discharge unit is configured to open a part of said discharge passage to the atmosphere so as to generate said pressure difference and thereby to discharge said water from said in-plane conduit.

12. The fuel cell system as set forth in claim 5, wherein said separators each have a supply hole for supplying the fuel into said in-plane conduit, and a discharge hole for discharging the fuel from said in-plane conduit.

13. The fuel cell system as set forth in claim 12, wherein between the adjacent separators, said supply holes are connected to each other to form a supply passage for supplying the fuel to said separators, and said discharge holes are connected to each other to form a discharge passage for discharging the fuel from said separators.

14. The fuel cell system as set forth in claim 1, wherein said cooling unit causes a gas stagnating in proximity of at least said heat radiation unit to flow so as to release heat from said heat radiation unit.

15. The fuel cell system as set forth in claim 1, further comprising a control substrate supporting thereon a control circuit for controlling driving of at least said gas flow unit and said cooling unit based on an environmental condition.

16. The fuel cell system as set forth in claim 1, wherein the driving of said gas flow unit and said cooling unit is controlled according to the amount of water remaining in said power generation unit which is calculated based on an environmental condition and the quantity of electric power generated by said power generation unit.

17. The fuel cell system as set forth in claim 1, further comprising a fuel supply unit configured to supply the fuel for reaction with said oxidant gas from a fuel storage unit to said power generation unit at the time of driving said power generation unit.

18. The fuel cell system as set forth in claim 1, further comprising a pressure control unit configured to control pressure of the fuel supplied to said power generation unit.

19. The fuel cell system as set forth in claim 1, wherein the gas flow unit and the cooling unit cause the respective oxidant gases to flow in a same direction from an intake side of the fuel cell system to an exhaust side of the fuel cell system.

20. The fuel cell system as set forth in claim 19, wherein the gas flow unit and the cooling unit are positioned on the intake side of the fuel cell system.

21. The fuel cell system as set forth in claim 1, wherein the heat transfer portion is formed of a material higher in thermal conductivity than materials constituting the upper-side portion and the lower-side portion.

22. The fuel cell system as set forth in claim 1, wherein each of the radiating fins has a thickness less than a thickness of the separator.

23. The fuel cell system as set forth in claim 1, wherein the cooling unit comprises a cooling fan and at least one of the radiating fins is disposed between the cooling fan and the second intake port.

24. An electronic apparatus comprising a fuel cell system, said fuel cell system comprising:
a power generation unit provided with a conduit for an oxidant gas containing at least oxygen;
a casing for covering at least said power generation unit
a heat radiation unit including a plurality of radiating fins, the heat radiation unit connected to said power generation unit so as to radiate heat from said power generation unit;
a separator included in the power generating unit, the separator including
an upper-side portion including fuel conduits,
a lower-side portion including oxidant gas channels, and
a heat transfer portion formed on the lower-side portion and formed in an area corresponding to positions of the fuel conduits and the oxidant gas channels and extending beyond an outer edge of the upper-side portion so as to be formed on surfaces of the radiating fins of said heat radiation unit;
a gas flow unit configured to suck said oxidant gas into a first intake port disposed on a first surface of said casing;
a cooling unit configured to suck said oxidant gas into a second intake port disposed on the first surface of said casing and adjacent to said first intake port;
a plurality of temperature detectors which detect a temperature of the power generation unit, the heat radiation unit, and the oxidant gas; and
a humidity detector which detects a humidity of the oxidant gas,
wherein an amount of moisture located inside the power generation unit and a temperature of the power generation unit are determined based on the temperatures detected by the plurality of temperature detectors and the humidity detected by the humidity detector,
wherein when the amount of moisture located inside the power generation unit and/or the temperature of the power generation unit deviate from a stable zone of the power generation unit having a proper moisture content and appropriate temperature, the cooling unit is driven independently from said gas flow unit to return a state of the power generation unit to the stable zone,
wherein when the amount of moisture located inside the power generation unit is superfluous, the superfluous moisture is discharged with air by the gas flow unit, and
wherein said electronic apparatus is driven by being supplied with electric power from said fuel cell system.

25. The electronic apparatus as set forth in claim 24, wherein the gas flow unit and the cooling unit cause the respective oxidant gases to flow in a same direction from an intake side of the fuel cell system to an exhaust side of the fuel cell system.

26. The electronic apparatus as set forth in claim 25, wherein the gas flow unit and the cooling unit are positioned on the intake side of the fuel cell system.

27. The electronic apparatus as set forth in claim 24, wherein the heat transfer portion is formed of a material higher in thermal conductivity than materials constituting the upper-side portion and the lower-side portion.

28. The electronic apparatus as set forth in claim 24, wherein each of the radiating fins has a thickness less than a thickness of the separator.

29. The electronic apparatus as set forth in claim 24, wherein the cooling unit comprises a cooling fan and at least one of the radiating fins is disposed between the cooling fan and the second intake port.

* * * * *